(12) United States Patent
Farivar et al.

(10) Patent No.: US 12,418,244 B2
(45) Date of Patent: Sep. 16, 2025

(54) SOLID STATE TRANSFORMER CONTROLLER

(71) Applicant: Nanyang Technological University, Singapore (SG)

(72) Inventors: Glen Ghias Farivar, Singapore (SG); Howe Li Yeo, Singapore (SG); Radhika Sarda, Singapore (SG); Fengjiao Cui, Singapore (SG); Abishek Sethupandi, Singapore (SG); Haonan Tian, Singapore (SG); Madasamy Palvesha Thevar, Singapore (SG); Brihadeeswara Sriram Vaisambhayana, Singapore (SG); Anshuman Tripathi, Singapore (SG)

(73) Assignee: Nanyang Technological University, Singapore (SG)

( * ) Notice: Subject to any disclaimer, the term of this patent is extended or adjusted under 35 U.S.C. 154(b) by 223 days.

(21) Appl. No.: 18/034,511

(22) PCT Filed: Nov. 3, 2021

(86) PCT No.: PCT/SG2021/050671
§ 371 (c)(1),
(2) Date: Apr. 28, 2023

(87) PCT Pub. No.: WO2022/098304
PCT Pub. Date: May 12, 2022

(65) Prior Publication Data
US 2023/0402936 A1     Dec. 14, 2023

(30) Foreign Application Priority Data
Nov. 4, 2020 (SG) .............................. 10202010978S

(51) Int. Cl.
*H02M 3/335* (2006.01)
*H02M 3/155* (2006.01)
(Continued)

(52) U.S. Cl.
CPC ......... *H02M 5/4585* (2013.01); *H02M 3/155* (2013.01)

(58) Field of Classification Search
CPC ............ H02M 3/285; H02M 3/33573; H02M 3/33584; H02M 7/4833
See application file for complete search history.

(56) References Cited

U.S. PATENT DOCUMENTS

| 7,050,311 B2 * | 5/2006 | Lai ........................ H02M 5/225 363/37 |
| 10,186,995 B2 * | 1/2019 | Dong ...................... H02M 1/32 |

(Continued)

FOREIGN PATENT DOCUMENTS

| AU | 201600827 | 8/2017 |
| CN | 105553304 A | 5/2016 |
| CN | 106026686 A * | 10/2016 ............ H02M 3/335 |

OTHER PUBLICATIONS

Radhika "A Control Strategy for Solid-State Transformers With Coupled Load Disturbance Attenuation Ability" (Year: 2024).*
(Continued)

*Primary Examiner* — Sisay G Tiku
(74) *Attorney, Agent, or Firm* — Sheppard Mullin Richter & Hampton LLP

(57) ABSTRACT

A decoupled system for controlling a solid state transformer (SST), the SST comprising an AC-to-DC stage, a DC-to-AC stage, and a DC-to-DC stage, the DC-to-DC stage comprising one or more DC-to-DC converters. The system comprises a stored energy controller coupled to the AC-to-DC stage, the energy controller configured to control the total
(Continued)

amount of stored energy within the capacitors of the SST; a power flow controller coupled to the DC-to-AC stage, the power flow controller configured to control power flow in the SST; and one or more energy balancing controllers each coupled to a corresponding DC-to-DC converter, each energy balancing controller configured to balance energy in the corresponding DC-to-DC converter.

13 Claims, 22 Drawing Sheets

(51) Int. Cl.
*H02M 3/28* (2006.01)
*H02M 5/458* (2006.01)
*H02M 7/483* (2007.01)

(56) References Cited

U.S. PATENT DOCUMENTS

| 10,263,456 B1* | 4/2019 | Wang | H02J 9/06 |
| 11,133,752 B2* | 9/2021 | Zhang | H02M 3/158 |
| 2019/0312521 A1* | 10/2019 | Cao | H02M 5/4585 |

OTHER PUBLICATIONS

Keerthi "Solid State Transformers for Smart Grid Control and Applications" (Year: 2022).*

Felipe "Surveying Solid-State Transformer Structures and Controls" (Year: 2020).*

Mao, X. et al., "Energy-based Control Design for a Solid State Transformer", Power and Energy Society General Meeting, 2010 IEEE, Aug. 31, 2010, pp. 1-7.

De Silva, H. H. H. et al., "Review on design and control of solid state transformer based microgrids", AIMS Energy, Dec. 13, 2019, vol. 7, No. 6, pp. 901-023.

Feng, G. et al., "Combined DC Voltage Control Scheme for Three port Energy Router Based on Instantaneous Energy Balance", 2016 IEEE Energy Coversion Congress and Exposition (ECCE), Sep. 22, 2016.

International Search Report and Written Opinion dated May 12, 2022 for Application No. PCT/US2021/050671.

* cited by examiner

HV-Side Control

LV-Side Control

SOLID STATE TRANSFORMER CONTROLLER

TECHNICAL FIELD

The present invention relates, in general terms, to systems for controlling a solid state transformer, and also relates to methods of controlling a solid state transformer.

BACKGROUND

Solid state transformers (SSTs) are identified as a potential solution to modernize and harmonize alternating current (AC) and direct current (DC) electrical networks and as suitable solutions in applications such as traction, electric ships, and aerospace industry. There are certain aspects regarding SSTs which still remain under research, such as how to effectively: (a) control the stored energy within the capacitors of the SSTs, (b) control power flow in the SSTs, and (c) balancing energy in the DC-to-DC converter of the SST.

A conventional control architecture for SSTs is based on the actual power path. However, such control architecture may not work well when the SST has more than one state variable to control in each stage. In practice, the AC-to-DC converter is usually a cascaded multilevel topology. In such case, applying the control architecture that follows the actual power path may create interferences between operation of individual converters of the SST. As a result, the voltages on all the DC side capacitors of the SST need to be balanced.

A typical method to balance and control the voltages on all the DC side capacitors is to use a voltage balancing algorithm. Also, different DC-to-DC converters of the same SST will operate to regulate the voltage on the LV-side capacitor. Therefore, a current sharing mechanism is also needed to equally distribute the power between the DC-to-DC stage. In such case, the controllers of DC-to-DC converters of the SST are coupled, and the (high-voltage) HV-side converter will face the challenge of decoupling the cluster controller and voltage balancing algorithm. In general, the control function of the different stages (e.g. HV AC-to-DC stage and DC-to-DC stage) cannot be fully separated.

In a conventional control system, the objective of the control system is to keep the capacitors' voltages constant. As the HV-side is often realized by three separate cascaded single-phase converters, the capacitors' voltages will have a second-order harmonic ripple, which depends on the power. Furthermore, any remaining additional ripple is filtered out after measurement before feeding the voltage signal back to the control system to avoid its propagation into the control system. Such measures to contain these voltage ripples add the direct cost of increasing the capacitors' size on the hardware and added complexity of the filtering mechanism on the software.

It would be desirable to overcome all or at least one of the above-described problems, or at least to provide a useful alternative.

SUMMARY

Disclosed herein is a system for controlling a solid state transformer (SST). The SST comprises an AC-to-DC stage, a DC-to-AC stage, and a DC-to-DC stage coupled between the AC-to-DC stage and the DC-to-AC stage, the DC-to-DC stage comprising one or more DC-to-DC converters. The system comprises:

a stored energy controller coupled to the AC-to-DC stage, the stored energy controller configured to control the total amount of stored energy within the capacitors of the SST;

a power flow controller coupled to the DC-to-AC stage, the power flow controller configured to control power flow in the SST; and one or more energy balancing controllers each coupled to a corresponding DC-to-DC converter, each energy balancing controller configured to balance energy in the corresponding DC-to-DC converter. In some embodiments, the stored energy controller, the power flow controller and the one or more energy balancing controllers are decoupled from one another.

In some embodiment, the stored energy controller, the power flow controller and the one or more energy balancing controllers are decoupled at a function level.

In some embodiment, the stored energy controller, the power flow controller and the one or more energy balancing controllers are decoupled at a state variable control level.

In some embodiment, the stored energy controller, the power flow controller and the one or more energy balancing controllers are configured with independent control objectives.

In some embodiment, the stored energy controller controls the AC-to-DC stage, the AC-to-DC stage comprising a plurality of AC-to-DC converters each charging/discharging a respective high voltage (HV) capacitor, to regulate a total amount of energy stored in capacitors of the SST according to:

$$\frac{dE}{dt} = P_{HV} - P_{LV}$$

where $E=0.5(\Sigma_{j=1}^{N} Cj_{HV} vj_{HVdc}^{2} + C_{LV} v_{LVdc}^{2})$, $vj_{HVdc}$ is a voltage of $j^{th}$ HV side capacitor, $Cj_{HV}$ is a capacitance of $j^{th}$ capacitor in HV-side, $v_{LVdc}$ is a voltage of LV side capacitor, $C_{LV}$ is a capacitance of the LV side capacitor, $P_{HV}=\Sigma_{j=1}^{N} Pi_{HV}$ with $P_{HV}$ being the active power passing through HV side converter, and $P_{LV}$ is the active power passing through the LV side converter.

In some embodiment, the power flow controller controls the DC-to-AC stage, the DC-to-AC stage comprising a DC-to-AC converter that charges/discharges a low voltage (LV) capacitor to satisfy $P_{LV}$.

In some embodiment, the energy balance controller is configured to indirectly control the respective dynamic capacitor voltage to actively remove or regulate the magnitude of voltage ripple on the HV capacitor voltage.

In some embodiment, the energy balance controller is configured to indirectly control the dynamic HV capacitor voltage based on a state variable defined by:

$$\frac{d\Delta Ej}{dt} = Pj_{dc-dc}, (j = 1, 2, \ldots, N),$$

where $\Delta Ej=0.5(Cj_{HV} vj_{HVdc}^{2} - C_{LV} v_{LVdc}^{2})$, (I=1, 2, ..., N) where $C_{LV}$ is the capacitance of the LV side capacitor, and $v_{LVdc}$ is the voltage of LV side capacitor.

In some embodiment, each controller is a proportional integral controller.

In some embodiment, power reference for each DC-to-DC converters is generated by adding a feedforward compensation to proportional integral output.

In some embodiment, power in the one or more DC-to-DC converters is regulated by a phase shift switching strategy.

Disclosed herein is also a method for controlling a solid state transformer (SST) using the system disclosed. The method comprises:
controlling stored energy in the SST using the stored energy controller;
controlling power flow in the SST using the power flow controller; and
balancing energy in the corresponding DC-to-DC converter using the one or more energy balancing controllers. In some embodiment, controlling stored energy, controlling power flow and balancing energy are performed by decoupling the stored energy controller, power flow controller and one or more energy balancing controllers.

In some embodiment, controlling stored energy occurs at a first location, controlling power flow occurs at a second location and balancing energy occurs at a third location, wherein at least two of the first location, second location and third location are spaced from each other.

BRIEF DESCRIPTION OF THE DRAWINGS

Embodiments of the present invention will now be described, by way of non-limiting example, with reference to the drawings in which.

DETAILED DESCRIPTION

The present invention relates to systems and methods for controlling a solid state transformer (SST). Said SST is a type of electric power converter that replaces a conventional transformer used in AC electric power distribution. It is more complex than a conventional transformer operating at utility frequency, but it can be smaller and lighter than a conventional transformer as it operates at high frequency. The SST in the present disclosure is a AC-to-DC-to-DC-to-AC converter, in which an active rectifier supplies power to a DC-to-DC converter, which supplies power to a power inverter.

The novelty of the proposed invention is fully decoupling the control system architecture of SSTs. The proposed control system is decoupled both in function level and state variable control level. Thus, the design of the control system becomes straightforward and the overall control system becomes simpler. The proposed control system regulates the instantaneous capacitors' voltages and actively removes the voltage ripple on the capacitors, which greatly reduces the size of the required passive components.

The present invention has several key advantages. First, the controller of each stage of SST is fully independent and each stage has independent control objectives, which eliminates interaction between controllers of stages. Second, the independent control structure for each stage allows the SST stages to be separated and deployed in different physical locations. Third, each state variable is controlled by an independent controller, which eliminates the possibility of interference within the control system. Fourth, the SST system can take advantage of advanced multicore processors because of fully decoupled control for state variables. Fifth, the proposed system does not need a voltage balancing mechanism, power-sharing mechanism and capacitor voltage (CV) filtering, which greatly simplifies the overall control system. The active CV shaping allows for the utilization of smaller DC capacitors, which results in more compact hardware. Last but not least, the definition of state variables, as well as added feedforward terms, ensures the linearity of the proposed control system.

The proposed decoupled control scheme is applicable for SST product deployment with reliable operation and covers all the functionalities for SST including, independent reactive power control, bidirectional power flow control, and ability to interconnect grids with different frequencies. A fully decoupled controller for each stage allows for deployment of each stage of SST in distant physical locations to use in applications such as interconnection between islands. The operation of each stage is independent of other stages that allow for separate designs using different technologies to replace or upgrade any stage with new hardware or controller.

Figure 1:
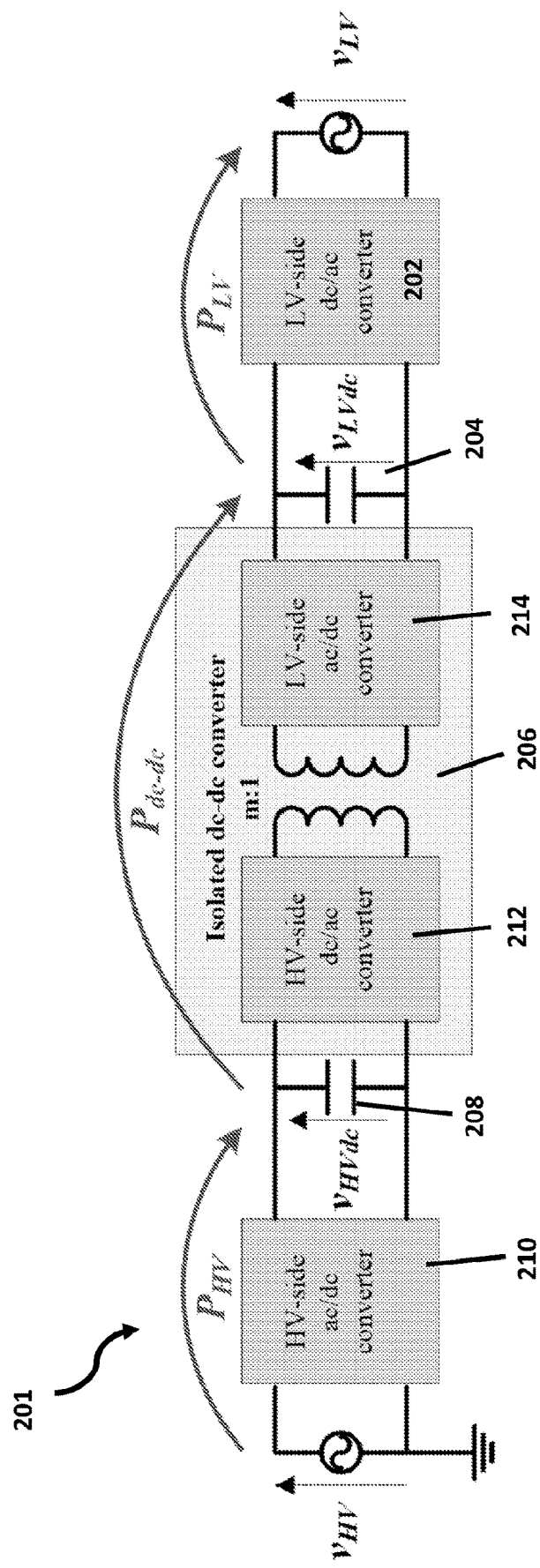
FIG. 1 shows a generic single phase SST architecture and its physical power flow hierarchy.

To introduce the key idea of the proposed system, the present disclosure first discusses some existing methods for controlling the SST in details. FIG. 1 shows an example single phase SST 201. The architecture is the most versatile and most complex SST as it uses DC coupling (also called direct coupling or conductive coupling) in both low voltage (LV) and high voltage (HV) sides. Although in FIG. 1 a single phase representation is used for simplicity, it will be appreciated that a high-power SST could also be a three-phase system.

In FIG. 1, a conventional control architecture for the SST system 201 is based on the actual power flow path and the control state variables are the capacitor voltages. Following the power flow direction in FIG. 1, the LV-side DC-to-AC converter 202 determines the active power by charging or discharging the LV-side capacitor 204, the isolated DC-to-DC converter 206 compensates for this power and regulates the voltage on the LV-side capacitor 204 by charging or discharging the HV-side capacitor 208, and finally, the HV-side converter 210 acts as a regulator for the HV-side capacitor 208. The isolated DC-to-DC converter 204 comprises a HV-side DC-to-AC converter 212 and a LV-side AC-to-DC converter 214. In FIG. 1, $P_{HV}$, $P_{LV}$, and $P_{dc-dc}$ are active power passing through the HV-side AC-to-DC converter 210, LV-side DC-to-AC converter 202, and DC-to-DC converter 206, respectively. In steady-state condition, $P_{HV}$, $P_{LV}$, and $P_{dc-dc}$ are equal excluding the losses. In FIG. 1, the HV AC is represented by $v_{HV}$ and LV AC is represented by $v_{LV}$. Similarly, the HV DC is represented by $v_{HVdc}$ and LV DC is represented by $v_{LVdc}$.

Figure 2:
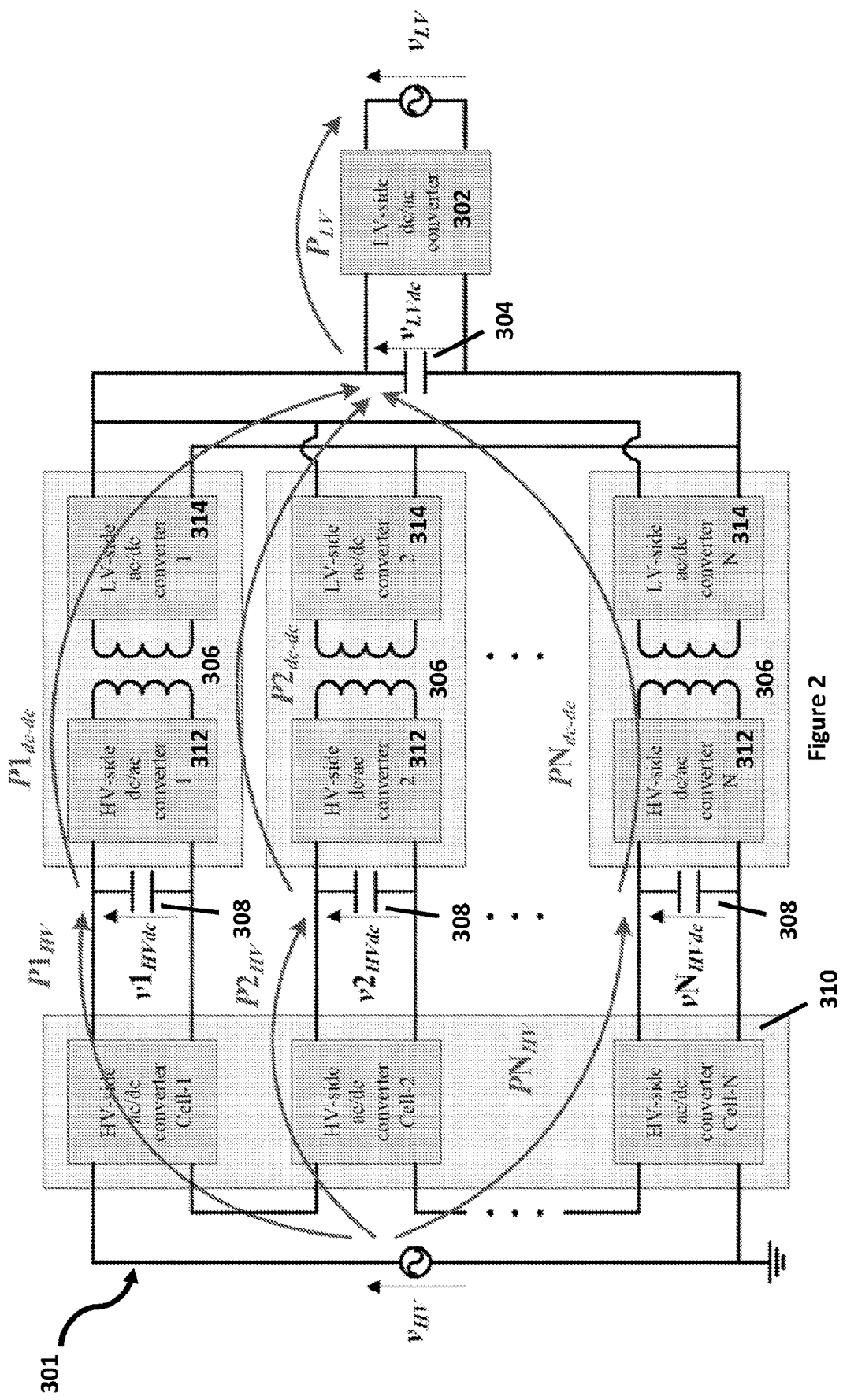
FIG. 2 shows a generic multiple phase SST architecture and its physical power flow hierarchy.

Said control architecture follows the actual power flow, and works well when the architecture has a single variable to control at each stage. However, the HV-side AC-to-DC converter 210 being a single level topology is not often used in practice. FIG. 2 shows an example multiple string SST 301. FIG. 2 shows a HV-side AC-to-DC converter 310 which is a cascaded multi-level topology that consists of multiple HV-side capacitors 308. Similarly, said SST 301 also comprises a plurality of DC-to-DC converters 306, each consisting of a HV-side DC-to-AC converter 312 and a LV-side AC-to-DC converter 314. The LV-side DC-to-AC converter 302 determines the active power by charging or discharging the LV-side capacitor 304. In FIG. 1, $P_{NHV}$, $P_{LV}$, and $PN_{dc-dc}$ are active power passing through the N-th cell of the HV-side AC-to-DC converter 310, LV-side DC-to-AC converter 302, and N-th DC-to-DC converter 306, respectively. The HV AC is represented by $v_{HV}$ for the HV-side AC-to-DC converter and LV AC is represented by $v_{LV}$. Similarly, the HV DC is represented by $vN_{HVdc}$ for the N-th capacitor and LV DC is represented by $v_{LVdc}$.

It will be appreciated that applying the control architecture as illustrated in FIG. 1 to the SST system 301 in FIG. 2 would create some interferences between the operation of individual converters, and would also make the control system become complex. To solve this problem, a typical method is to use an extra voltage balancing algorithm. It will be appreciated that a plurality of DC-to-DC converters 306 operate to regulate the voltage on the LV-side capacitor 304. Hence, an extra current sharing mechanism will be needed to equally distribute the power between the DC-to-DC stages 306. Consequently, the controllers of DC-to-DC converters 306 need to be coupled. In addition, the HV-side converters 310 and 312 will face the challenge of decoupling the cluster voltage controller and voltage balancing algorithm.

Figure 3:
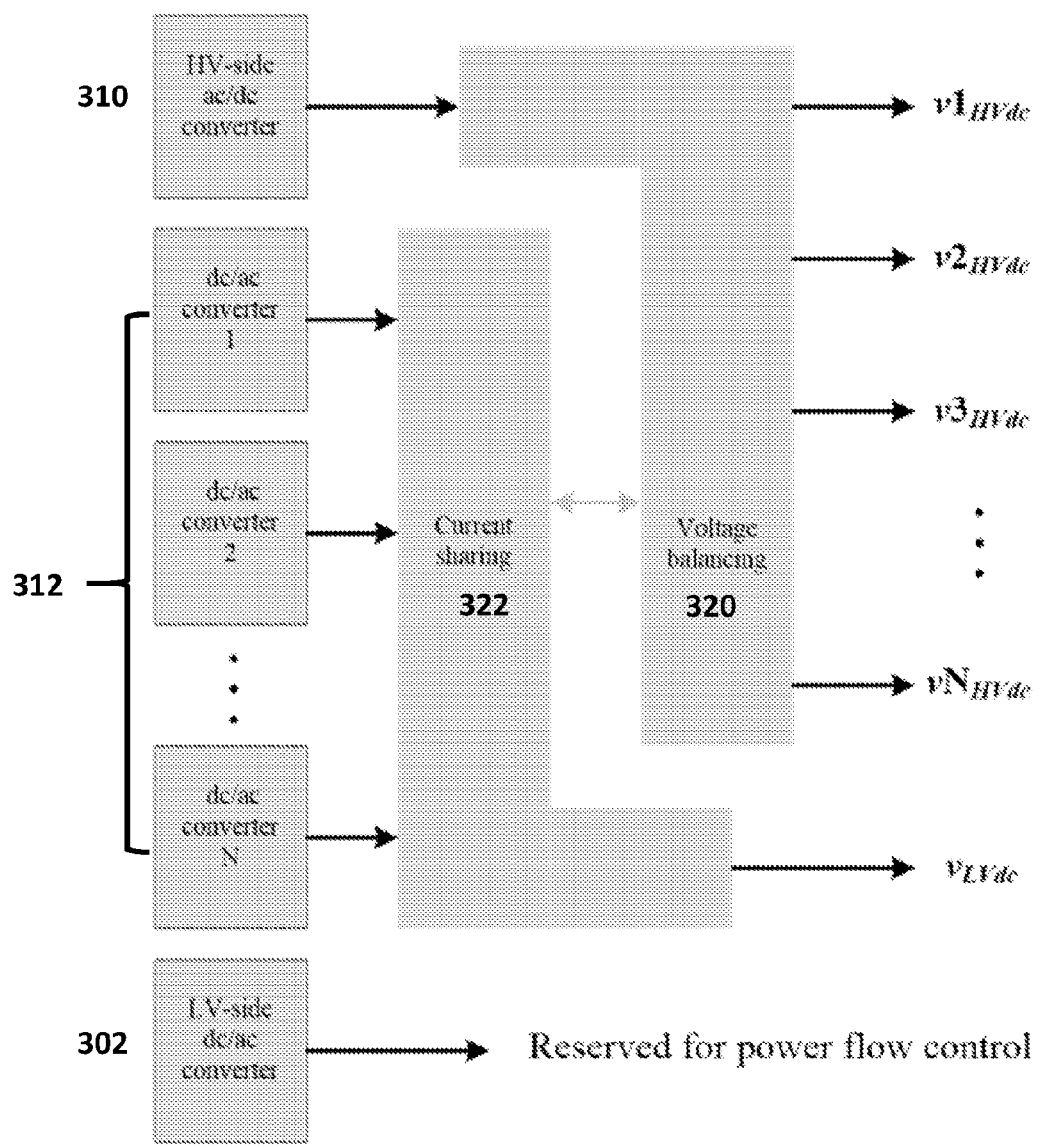
FIG. 3 shows a state variable control assignments for the converters of the SST according to FIG. 2.

FIG. 3 shows the overall control objective of each independent converter for controlling all the internal state variables. In the control architecture used for controlling the SST 301, the HV-side state variables as well as controllers of DC-to-DC converters are dependent. The operation of voltage balancing modules 320 and current sharing modules 322 are coupled. The present disclosure uses the following two capacitors' voltages dynamic equations to illustrate such couplings:

$$\frac{dvi_{HVdc}}{dt} = \frac{1}{Ci_{HV}vi_{HVdc}}(Pi_{HV} - Pi_{dc-dc}), (i = 1, 2, \dots, N)$$

$$\frac{dv_{LVdc}}{dt} = \frac{1}{C_{LV}v_{LVdc}}\left(\sum_{j=1}^{N} Pi_{dc-dc} - P_{LV}\right)$$

$Ci_{HV}$ represents the capacitance of i-th cell in HV-side and $C_{LV}$ is the capacitance on the LV-side. $\Sigma_{i=1}^{N} Pi_{HV} = P_{HV}$. The HV-side powers to regulate the HV-side state variables are not independent. The control of LV-side state variable using $\Sigma_{j=1}^{N} Pi_{dc-dc}$ interferes with the control of the HV-side state variables.

Figure 4:
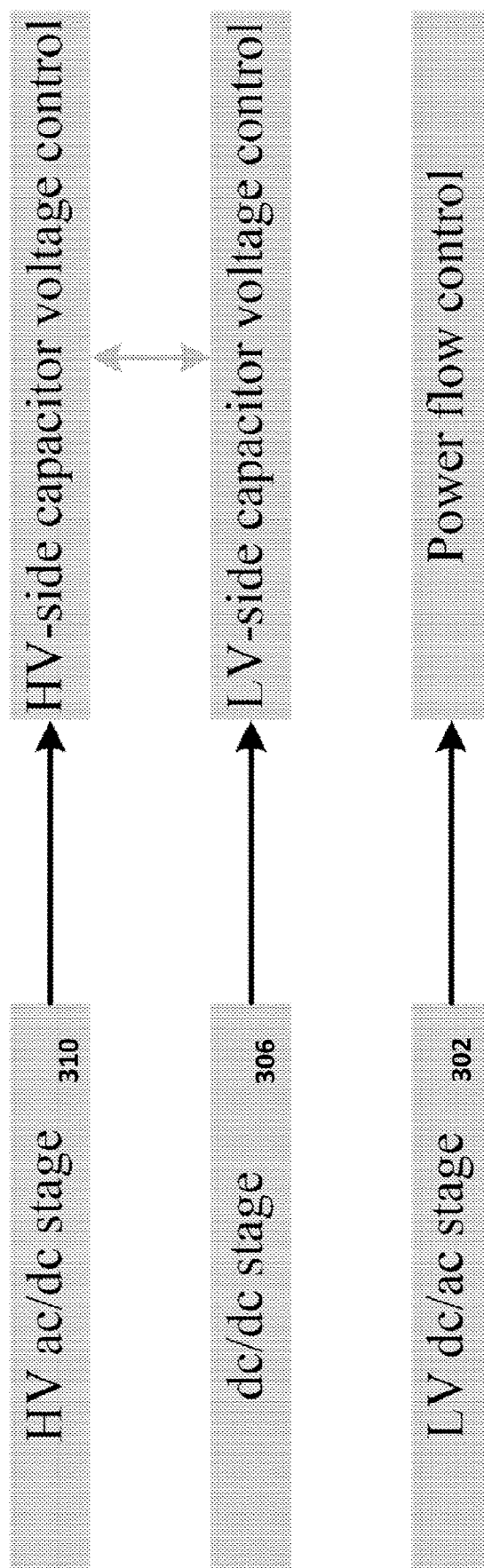
FIG. 4 shows control function assignment for the stages of the SST according to FIG. 2.

FIG. 4 shows the corresponding control function assignment for each stage (i.e., HV AC-to-DC stage 310, DC-to-DC stage 306, and LV DC-to-AC stage 302). In particular, at HV AC-to-DC stage, the HV-side capacitor voltage needs to be controlled and balanced. At DC-to-DC stage, the LV-side capacitor voltage needs to be controlled and the power processed by DC-to-DC converters needs to be balanced. At LV AC-to-DC stage, the power flow needs to be controlled to control power flow in the SST 301. It will be appreciated that the controller of each stage of the SST 301 is not independent and each stage does not have independent control objectives. As shown in FIG. 4, the HV-side capacitor voltage control and LV-side capacitor voltage control are coupled. As a result, interaction between the controllers of said stages 302, 306, and 310 cannot be eliminated. The control function of each stage cannot be separated.

Figure 5:
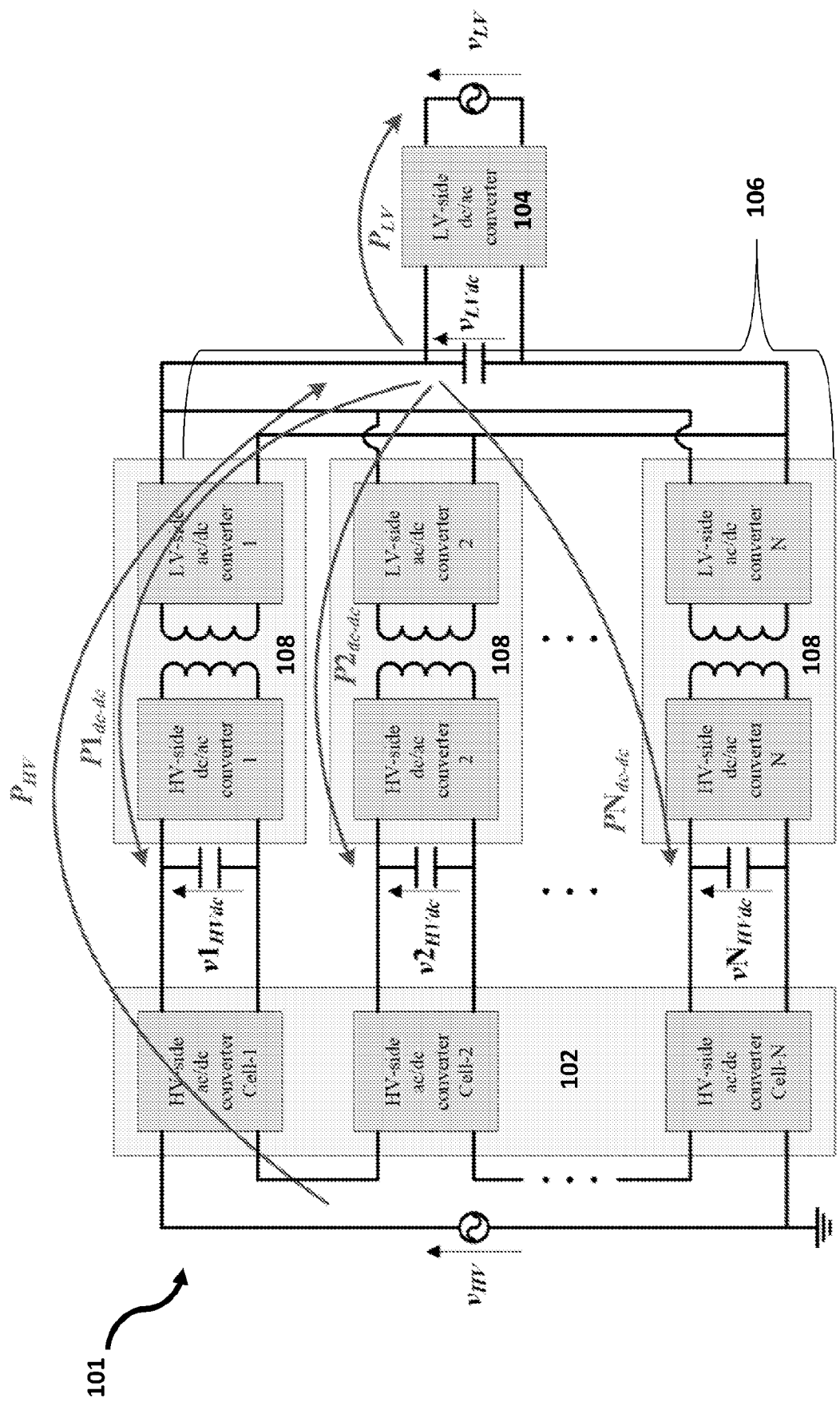
FIG. 5 shows a generic multiple phase SST architecture and its imaginary power flow hierarchy.

To resolve the mentioned issue of coupling among the state variables control (illustrated in FIG. 3), a novel control architecture is proposed in the present invention. The proposed control architecture offers a decoupled control platform that significantly simplifies the overall control system by eliminating the need for voltage balancing and power sharing mechanisms. FIG. 5 illustrates an example system for controlling a SST 101. The SST 101 comprises an AC-to-DC stage 102, a DC-to-AC stage 104, and a DC-to-DC stage 106 coupled between the AC-to-DC stage 102 and the DC-to-AC stage 104, the DC-to-DC stage 106 comprising one or more DC-to-DC converters 108. In the proposed control solution, instead of following the physical power flow, the system is designed based on an imaginary power flow hierarchy as shown in FIG. 5.

In FIG. 5, $P_{HV}$, $P_{LV}$, and $PN_{dc-dc}$ are active power passing through the HV-side AC-to-DC converter 102, LV-side DC-to-AC converter 104, and N-th DC-to-DC converter, respectively. The HV AC is represented by $v_{HV}$ for the HV-side AC-to-DC converter and LV AC is represented by $v_{LV}$. Similarly, the HV DC is represented by $vN_{HVdc}$ for the N-th capacitor and LV DC is represented by $v_{LVdc}$.

Figure 6:
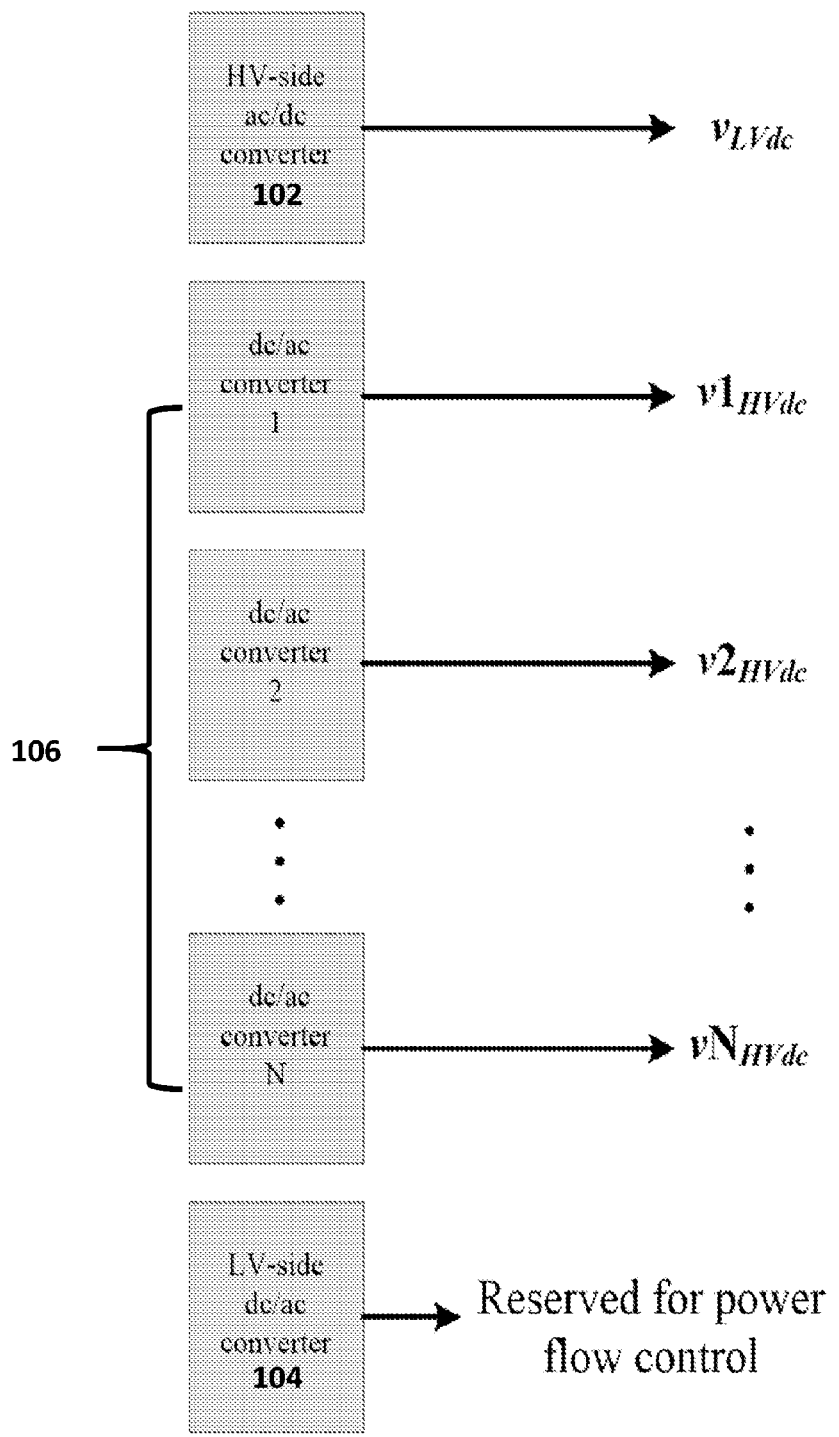
FIG. 6 shows a state variable control assignments for the converters of the SST according to FIG. 5.

FIG. 6 shows the proposed function assignment for each SST stage. In particular, the AC-to-DC stage 102, which comprises a plurality of AC-to-DC converters controls a LV capacitor voltage. The power flow controller controls the DC-to-AC stage, the DC-to-AC stage comprising a DC-to-AC converter 104 that charges/discharges a LV capacitor to satisfy power demand ($P_{LV}$), that is, the power passing through the DC-to-AC converter. The DC-to-DC stage 106, comprising one or more DC-to-DC converters, each assigned to control corresponding HV capacitor voltage.

For the SST 101 controlled by the proposed system, the voltages of the capacitors dynamics can be written as:

$$\frac{dv_{j_{HVdc}}}{dt} = \frac{P_{j_{dc-dc}}}{C_{j_{HV}} v_{j_{HVdc}}}, (j = 1, 2, \ldots, N)$$

$$\frac{dv_{LVdc}}{dt} = \frac{1}{C_{LV} v_{LVdc}} \left( P_{HV} - \sum_{j=1}^{N} P_{j_{dc-dc}} - P_{LV} \right)$$

$Cj_{HV}$ represents the capacitance of j-th cell in HV-side and $\Sigma_{j=1}^{N}=P_{HV}$. By using such a power flow model, each state variable is now controllable with an independent converter. Therefore, the need for power-sharing or voltage balancing is eliminated as visualized in FIG. 6, which illustrates state variable control assignment for each independent converter. It will be appreciated that though the proposed control strategy simplifies the control system significantly, the simplification still relies on some physical limitations. The assumption that $P_{HV}$ passing through DC-to-DC stage with no dynamic to consider is not valid for low bandwidth DC-to-DC operation. Furthermore, the coupling issue among state variables is not fully resolved as action of DC-to-DC converters to control HV-side state variables effects LV-side state variable as well.

To resolve mentioned issues, and achieve a fully decoupled control system, the present invention redefines the state variables based on inertia or energy instead of capacitor voltages. As a result, the HV-side converter's control function is to control the total stored energy in the converter regardless of where that energy is being stored. The functionality of each DC-to-DC converter is to distribute this energy among capacitors. The DC-to-DC converters can only transfer energy from one capacitor to other, i.e., they cannot change the total amount of stored energy in the system, and thus their operation will not have any effect on the operation of HV-side converter. The controllers in the present invention remove the capacitors' voltages ripple, which eliminates the need for any filtering mechanism or large DC capacitors.

Broadly, the proposed decoupled control system comprises:
- a stored energy controller (not shown) coupled to the AC-to-DC stage 102, the stored energy controller configured to control the total amount of stored energy within the capacitors of the SST 101;
- a power flow controller (not shown) coupled to the DC-to-AC stage 104, the power flow controller configured to control power flow in the SST 101; and
- one or more energy balancing controllers (not shown) each coupled to a corresponding DC-to-DC converter, each energy balancing controller configured to balance energy in the corresponding DC-to-DC converter.

In sum, the proposed control system fully decouples the control of each state variable within SST. During normal operation, each stage of SST namely, high voltage side DC-to-AC converter, DC-to-DC converters, and low voltage side AC-to-DC converter, is responsible for only one control objective to eliminate any unwanted coupling between the operation of these stages. The controller of each stage is linear, which improves performance and further simplifies the design. In addition, the proposed control system fully eliminates second-order ripple on the voltages of the capacitors, which facilitates the use of smaller film capacitors.

It will be appreciated that the stored energy controller, the power flow controller and the one or more energy balancing controllers are decoupled from one another. In the present disclosure, the term "decoupled", when used in relation to the stored energy controller, power flow controller and energy balancing controller, refers to each controller being capable of exercising its control function independently of the other controllers.

It will be appreciated that the stored energy controller, the power flow controller and the one or more energy balancing controllers can be decoupled at different levels. In particular, the proposed stored energy controller, the power flow controller and the one or more energy balancing controllers may be decoupled at a function level and/or a state variable control level. As such, the proposed control system can eliminate the need for voltage balancing and power sharing mechanisms. Also, voltage ripples of capacitors in the SST can be actively removed, which eliminates the need for any filtering mechanism or additional large dc capacitors. At the same time, the stored energy controller, the power flow controller and the one or more energy balancing controllers are configured with independent control objectives, which eliminates interaction between controllers of the AC-to-DC stage, DC-to-AC stage, and DC-to-DC stage.

Figure 7:
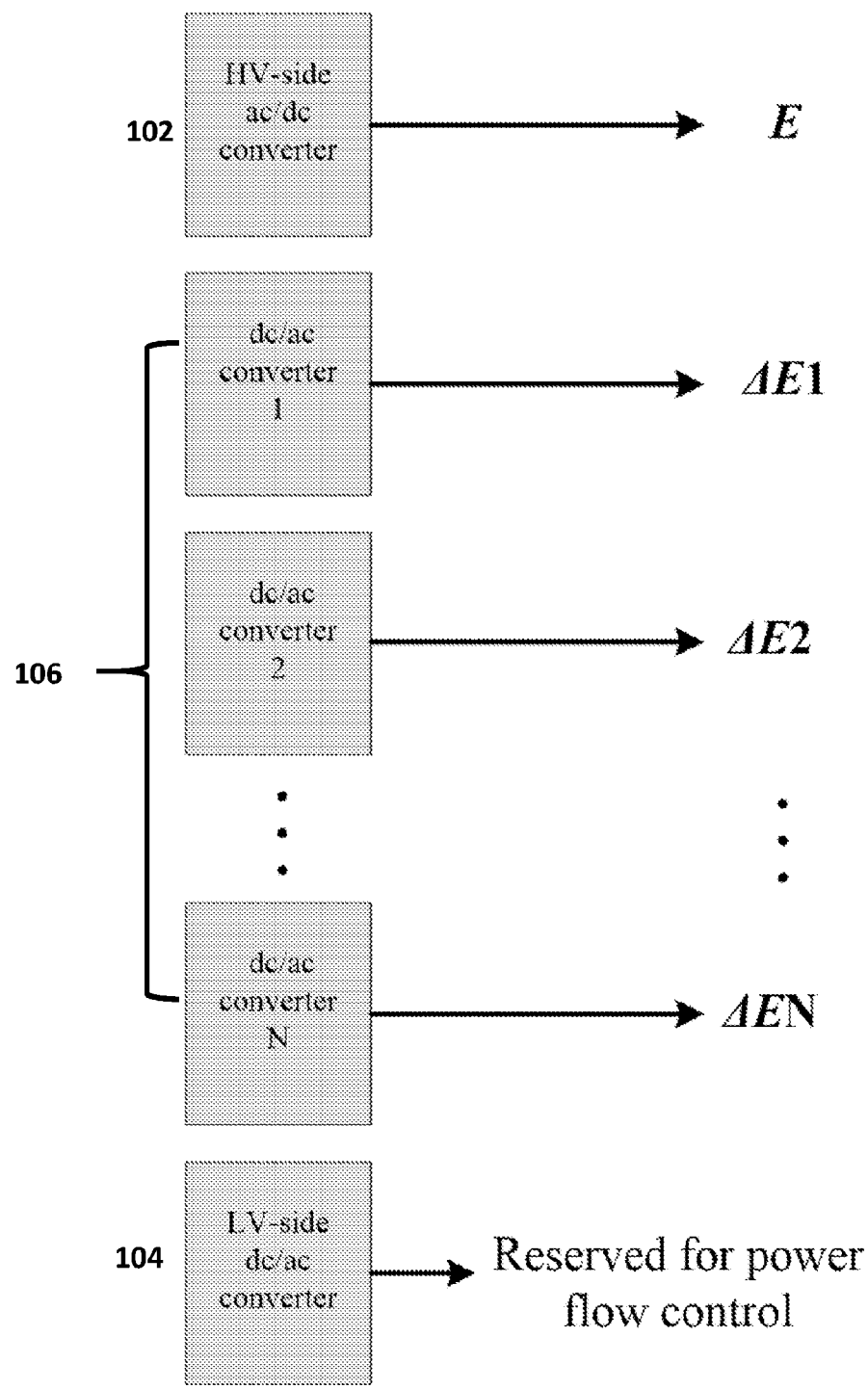
FIG. 7 shows energy related state variables for controlling the SST.

FIG. 7 illustrates the proposed state variables for controlling SST 101. As shown in FIG. 7, the LV-side DC-to-AC converter is reserved for power flow control. Said energy balancing controllers are configured to indirectly control the dynamic HV capacitor voltage based on a state variable defined by:

$$\frac{d\Delta Ej}{dt} = P_{j_{dc-dc}}, (j = 1, 2, \ldots, N),$$

where $\Delta Ej=0.5(Cj_{HV} v_{j_{HVdc}}^2 - C_{LV} v_{LVdc}^2)$, (j=1, 2, ..., N) where $C_{LV}$ is the capacitance of the LV side capacitor, and $v_{LVdc}$ is the voltage of LV side capacitor. Stored energy controller coupled to the AC-DC stage is configured to control the total amount of stored energy within the capacitors based on a state variable defined by:

$$\frac{dE}{dt} = P_{HV} - P_{LV}$$

where $E=0.5(\Sigma_{j=1}^{N} Cj_{HV} v_{j_{HVdc}}^2 + C_{LV} v_{LVdc}^2)$, $v_{j_{HVdc}}$ is a voltage of $j^{th}$ HV side capacitor, $Cj_{HV}$ is a capacitance of $j^{th}$ capacitor in HV-side, $v_{LVdc}$ is a voltage of LV side capacitor, $C_{LV}$ is a capacitance of the LV side capacitor, $P_{HV}=\Sigma_{j=1}^{N} Pi_{HV}$ with $P_{HV}$ being the active power passing through HV side converter, and $P_{LV}$ is the active power passing through the LV side converter. In the present disclosure, a total amount of energy stored in capacitors of the SST can be controlled linearly according to the above equation.

Figure 8:
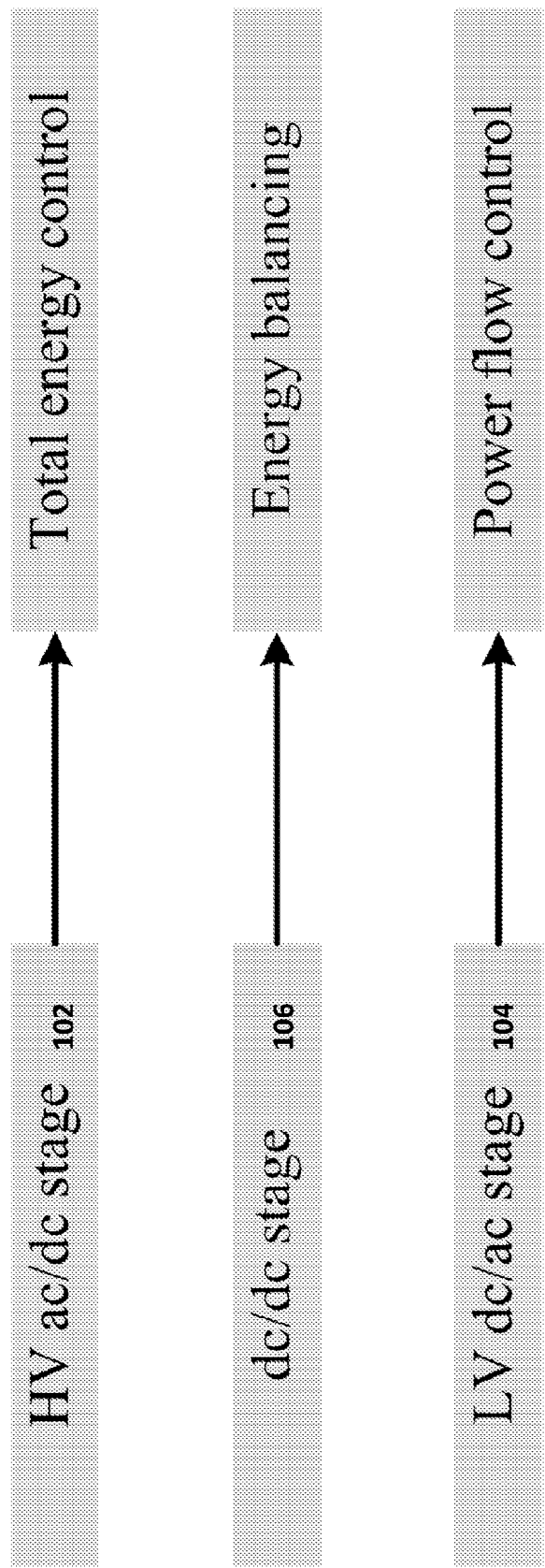
FIG. 8 shows control function assignment for the stages of the SST according to FIG. 7.

The redefined fully decoupled control functions for each stage are shown in FIG. 8. In particular, at HV AC-to-DC stage 102, the total amount of stored energy within the capacitors of the SST needs to be controlled. At DC-to-DC stage 106, the energy balance is achieved by controlling the difference in stored energy in a HV capacitor and a LV capacitor of each DC-to-DC converter. At LV AC-to-DC stage 104, the power flow needs to be controlled to control power flow in the SST. The controller of each stage of the SST is independent and each stage does have independent control objectives. It will be appreciated that the independent control structure for each stage allows the SST stages to be separated and deployed in different physical locations.

Figure 9A:
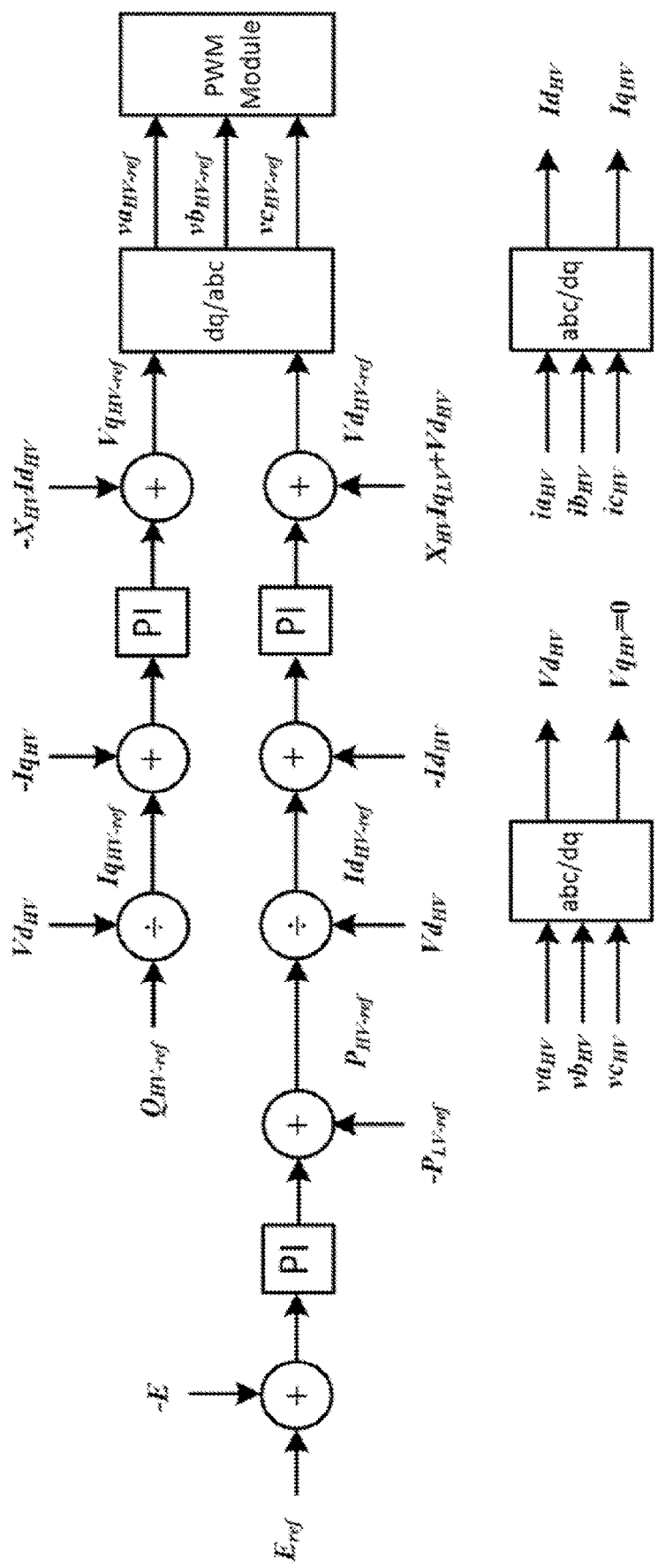
FIG. 9A shows HV side control architecture for controlling the SST according to FIG. 7.
Figure 9B:
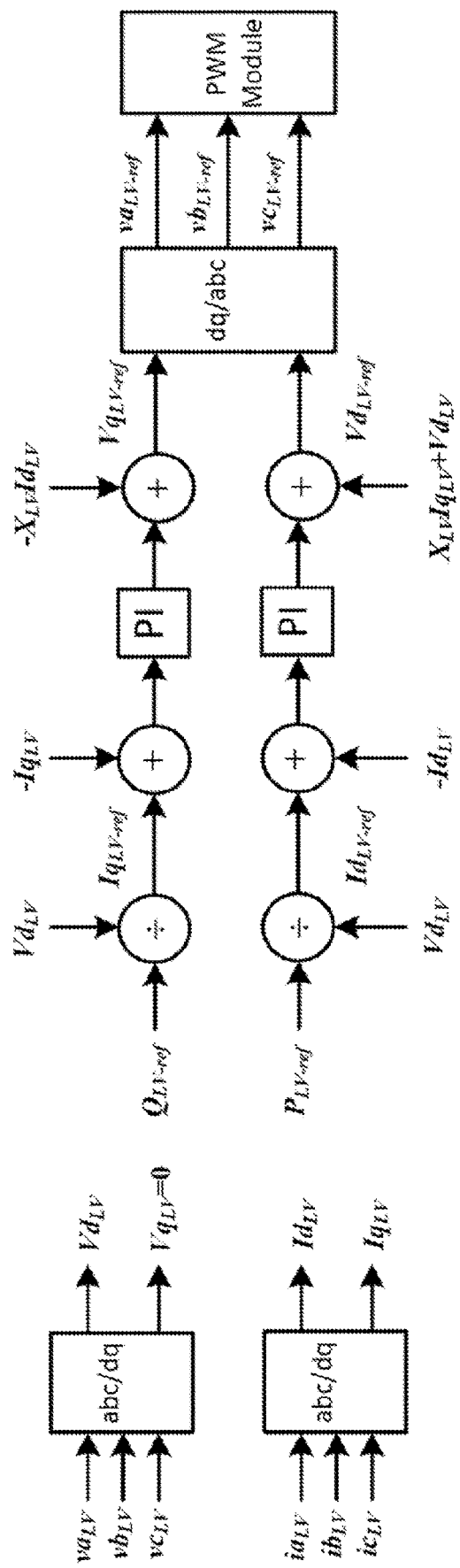
FIG. 9B shows LV side control architecture for controlling the SST according to FIG. 7.
Figure 9C:
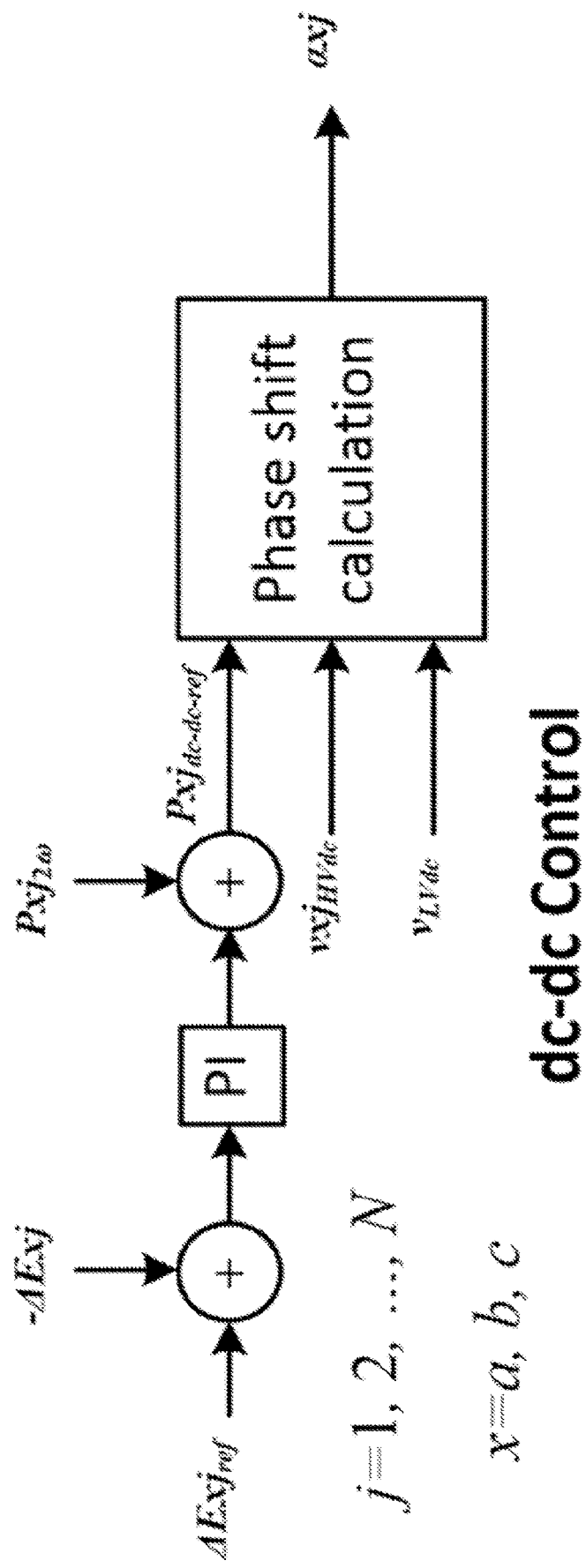
FIG. 9C shows DC-to-DC side control architecture for controlling the SST according to FIG. 7.

FIG. 9 illustrates the details of the proposed decoupled control system. As shown in FIG. 9, the control system is composed of three independent control modules for each stage of the SST 101 namely, the stored energy controller on the HV-side (see FIG. 9A), power flow controller on the LV-side (see FIG. 9B), and energy balancing controllers on the DC-to-DC side (see FIG. 9C). In particular, as in FIG. 9B, the power flow is controlled by the power flow controller on the LV-side, which may use a well-known decoupled current controller. However, any other current control scheme can be applied to control the active and reactive powers. Here, Vd and Vq are the dq components of three-phase voltage shown by va, vb, and vc. Similarly, the dq components of the three-phase current, ia, ib, and ic, are Id and Iq. The LV-side quantities are distinguished from the HV-side ones using subscripts LV and HV. The subscript ref represents the reference signals. The active and reactive powers are shown as P and Q, respectively.

As shown in FIG. 9C, for the energy balancing controllers at the DC-to-DC stage, individual proportional integral controllers (PID controllers) are used to maintain energy balance between the capacitors by controlling the power flow. It will be appreciated that each controller in the proposed control system is a PID controller. A PID controller is a control loop mechanism employing feedback that is widely used in industrial control systems and a variety of other applications requiring continuously modulated control. A PID controller continuously calculates an error value as the difference between a desired set point and a measured process variable and applies a correction based on proportional, integral, and derivative terms.

In some embodiments, power reference for each DC-to-DC converters is generated by adding a feedforward compensation to proportional integral output. The power reference for the j-th DC-to-DC stage at phase X, $PXj_{dc-dc-ref}$ is generated by adding a feedforward term to the output of the PID controller. This feedforward compensation $Pxj_{2\omega}$ is defined as:

$$Pxj_{2\omega} = \frac{Vd_{HV}Id_{HV} + (2vx_{HV-ref}ix_{HV-ref} - Vd_{HV}Id_{HV})A}{-2N}$$

In particular, by adding this feedforward term second-order power oscillations will circulate between the phases through DC-to-DC converters. Therefore, the voltages on the DC capacitors remain constant and will not oscillate. By utilizing this feature, the size of the HV-side capacitors can be much smaller than conventional systems. It will be appreciated that in the above equation, A is a weighting factor ranging from zero to one to controls the oscillating power. As A approaches one, the ripple on the capacitor approaches zero and the capacitor size theoretically approaches zero. Conversely, as A approaches zero, the second-order harmonic on the capacitor's voltage grows. Hence, the capacitance needs to increase to limit this ripple on 10%.

In the present disclosure, the power in the proposed DC-to-DC side controller is regulated by phase shift switching strategy. It will be appreciated that other switching strategy may also be used. In particular, the delay between the LV-side and HV-side converters' waveforms are $$\alpha = \frac{\pi}{2}\left(1 - \sqrt{1 - \frac{8\ fLP}{mv_{HVdc}v_{LVdc}}}\right)$$

where P is the power magnitude (absolute value), f is the switching frequency, α is the phase shift magnitude and L is the total inductance seen from HV-side. In the present disclosure, the HV-side control uses a PID controller to regulate total stored energy within the capacitors. The current controller for HV-side is similar to the one used for LV-side. In the HV-side the generated ac voltage reference by the current controller is equally distributed between the cells of HV-side multilevel converter to achieve equal power distribution.

Figure 10:
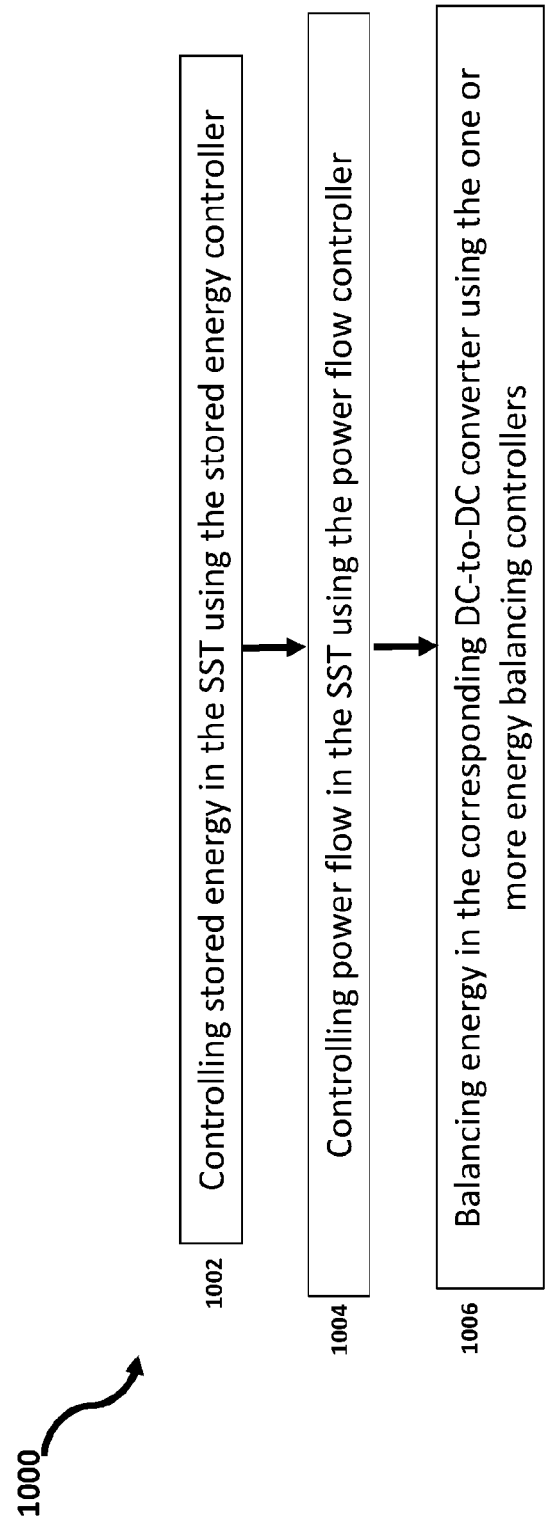
FIG. 10 is a flow diagram of a method for controlling a multiple phase SST.

FIG. 10 illustrates an example method 1000 for controlling a SST using the system disclosed. Broadly, the method 1000 comprises:

Step 1002: controlling stored energy in the SST using the stored energy controller;

Step 1004: controlling power flow in the SST using the power flow controller; and Step 1006: balancing energy in the corresponding DC-to-DC converter using the one or more energy balancing controllers. It will be appreciated that controlling stored energy, controlling power flow and balancing energy are performed by decoupling the stored energy controller, power flow controller and one or more energy balancing controllers.

In some embodiment, controlling stored energy occurs at a first location, controlling power flow occurs at a second location and balancing energy occurs at a third location, wherein at least two of the first location, second location and third location are spaced from each other. It will be appreciated that the independent control structure for each stage allows the SST stages to be separated and deployed in different physical locations. Each state variable is controlled by an independent controller, which eliminates the possibility of interference within the control system.

Figure 11:
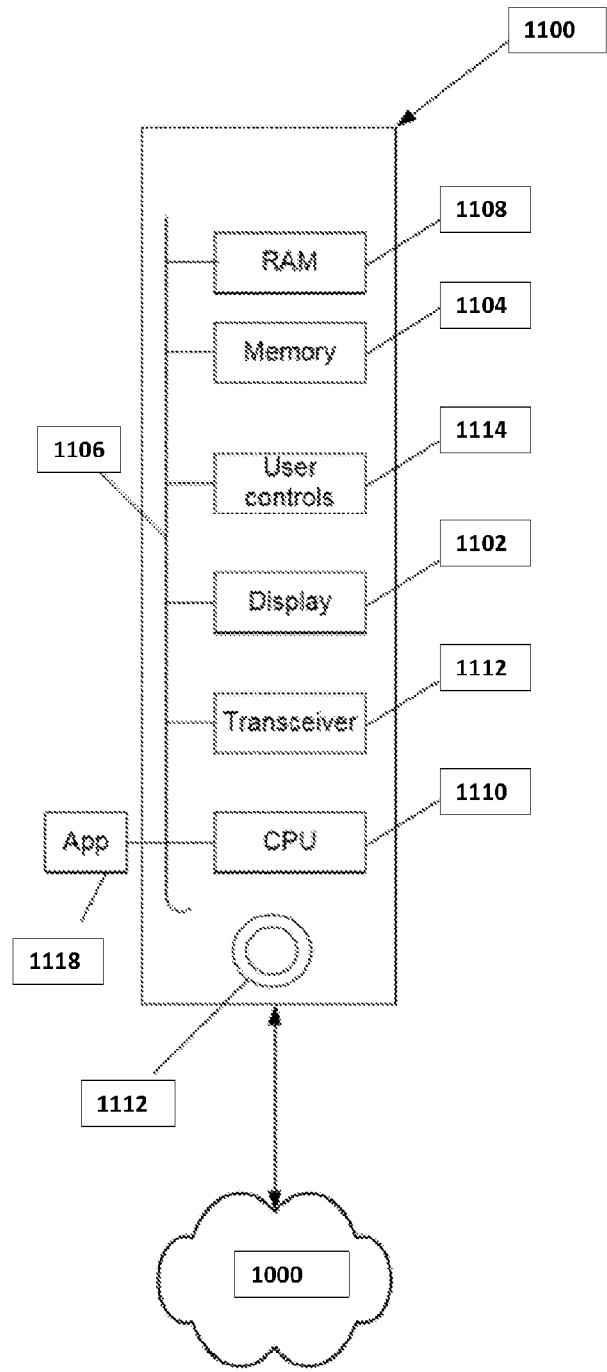
FIG. 11 is a schematic diagram showing components of an exemplary computer system for performing the methods described herein.

FIG. 11 is a block diagram showing an exemplary computer device 1100, in which embodiments of the invention may be practiced. The computer device 1100 may be a mobile computer device such as a smart phone, a wearable device, a palm-top computer, and multimedia Internet enabled cellular telephones, an on-board computing system or any other computing system, a mobile device such as an iPhone™ manufactured by Apple™, Inc or one manufactured by LG™, HTC™ and Samsung™, for example, or other device.

As shown, the mobile computer device 1100 includes the following components in electronic communication via a bus 1106:

(a) a display 1102;
(b) non-volatile (non-transitory) memory 1104;
(c) random access memory ("RAM") 1108;
(d) N processing components 1110;
(e) a transceiver component 1112 that includes N transceivers; and
(f) user controls 1114.

Although the components depicted in FIG. 11 represent physical components, FIG. 11 is not intended to be a hardware diagram. Thus, many of the components depicted in FIG. 11 may be realized by common constructs or distributed among additional physical components. Moreover, it is certainly contemplated that other existing and yet-to-be developed physical components and architectures may be utilized to implement the functional components described with reference to FIG. 11.

The display 1102 generally operates to provide a presentation of content to a user, and may be realized by any of a variety of displays (e.g., CRT, LCD, HDMI, micro-projector and OLED displays).

In general, the non-volatile data storage 1104 (also referred to as non-volatile memory) functions to store (e.g., persistently store) data and executable code. The system architecture may be implemented in memory 1104, or by instructions stored in memory 1104.

In some embodiments for example, the non-volatile memory 1104 includes bootloader code, modem software, operating system code, file system code, and code to facilitate the implementation components, well known to those of ordinary skill in the art, which are not depicted nor described for simplicity.

In many implementations, the non-volatile memory 1104 is realized by flash memory (e.g., NAND or ONENAND memory), but it is certainly contemplated that other memory types may be utilized as well. Although it may be possible to execute the code from the non-volatile memory 1104, the executable code in the non-volatile memory 1104 is typically loaded into RAM 1108 and executed by one or more of the N processing components 1110.

The N processing components 1110 in connection with RAM 1108 generally operate to execute the instructions stored in non-volatile memory 1104. As one of ordinarily skill in the art will appreciate, the N processing components 1110 may include a video processor, modem processor, DSP, graphics processing unit (GPU), and other processing components.

The transceiver component 1112 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The system 1100 of FIG. 11 may be connected to any appliance 1118, such as one or more cameras mounted to the vehicle, a speedometer, a weather service for updating local context, or an external database from which context can be acquired.

It should be recognized that FIG. 11 is merely exemplary and in one or more exemplary embodiments, the functions described herein may be implemented in hardware, software, firmware, or any combination thereof. If implemented in software, the functions may be stored on or transmitted over as one or more instructions or code encoded on a non-transitory computer-readable medium 1104. Non-transitory computer-readable medium 1104 includes both computer storage medium and communication medium including any medium that facilitates transfer of a computer program from one place to another. A storage medium may be any available medium that can be accessed by a computer.

Figure 12:
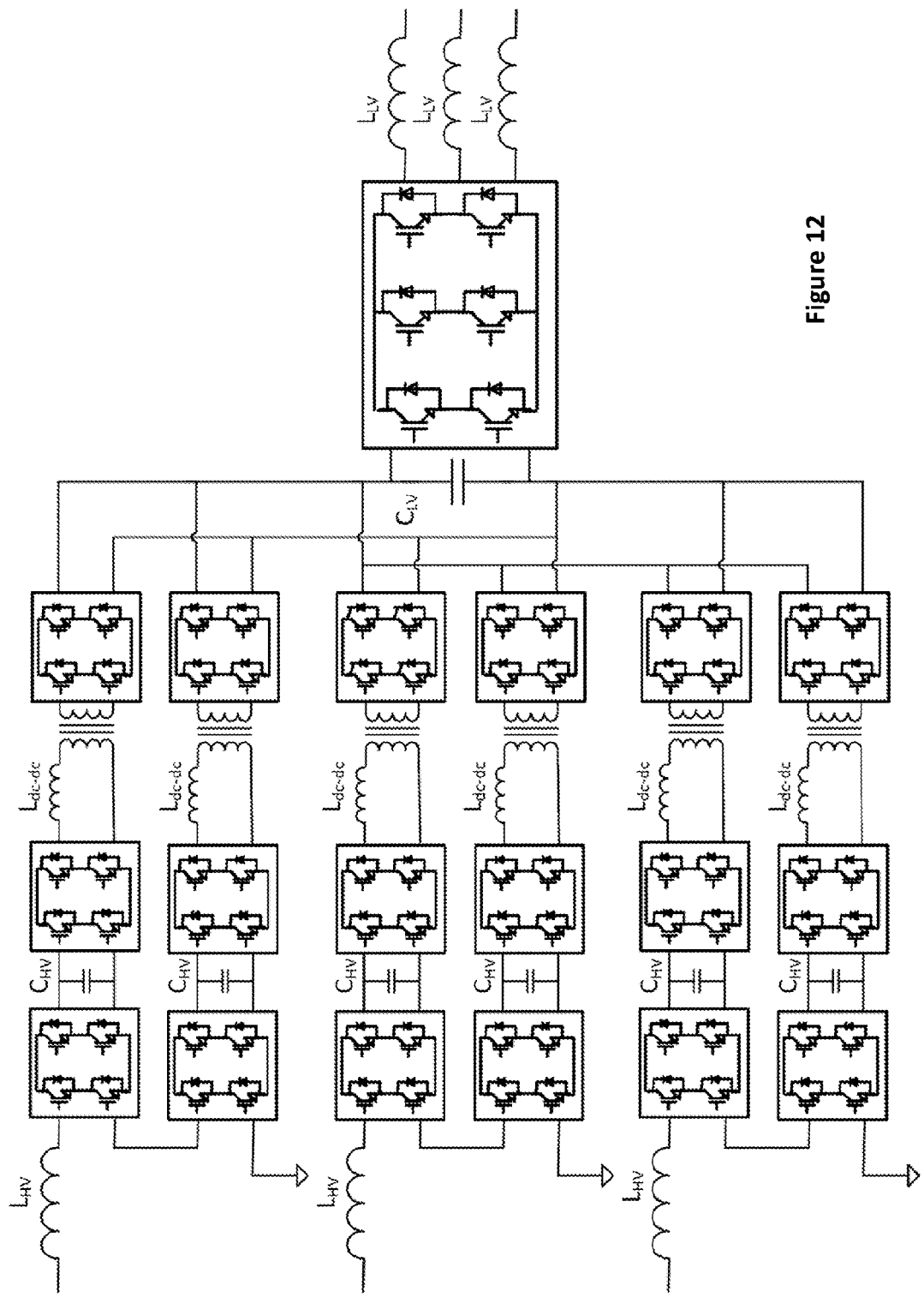
FIG. 12 shows a SST architecture for simulation.

Simulation Results:

The present invention now uses simulation to validate the validate the proposed decoupled linear SST control strategy. As an example, a 12 kVA SST that connects a three-phase 110 V 60 HZ grid to a 220 V 50 HZ grid is simulated in MATLAB/Simulink environment. FIG. 12 illustrates an SST hardware used for the simulation. Table I shows parameters of the SST hardware for simulation.

| | Parameter | Symbol | Quantity |
|---|---|---|---|
| HV-side | Phase voltage (rms value) | $V_{HV\text{-}rms}$ | 220 V |
| | Rated dc voltage | $V_{HVdc}$ | 250 V |
| | Capacitance | $C_{HV}$ | 0.1 mF |
| | Grid frequency | $f_{gHV}$ | 50 HZ |
| | Filter inductor | $L_{HV}$ | 2 mH |
| | Switching frequency (per H-bridge) | $f_{HV}$ | 5 kHz |
| | Number of H-bridges per phase | N | 2 |
| LV-side | Phase voltage (rms value) | $V_{LV\text{-}rms}$ | 110 V |
| | Rated dc voltage | $V_{LVdc}$ | 350 V |
| | Capacitance | $C_{LV}$ | 3 mF |
| | Grid frequency | $f_{gLV}$ | 60 Hz |
| | Filter inductor | $L_{LV}$ | 1 mH |
| | Switching frequency | $f_{LV}$ | 10 kHz |
| | Rated power | S | 12 kVA |
| DC-to-DC stage | HF transformer turn ration | m | 1 |
| | Switching frequency | $f_{DC\text{-}to\text{-}DC}$ | 10 kHz |
| | Inductance | $L_{DC\text{-}to\text{-}DC}$ | 0.2 mH |
| | Weighting factor | A | 1 |

Figure 13:
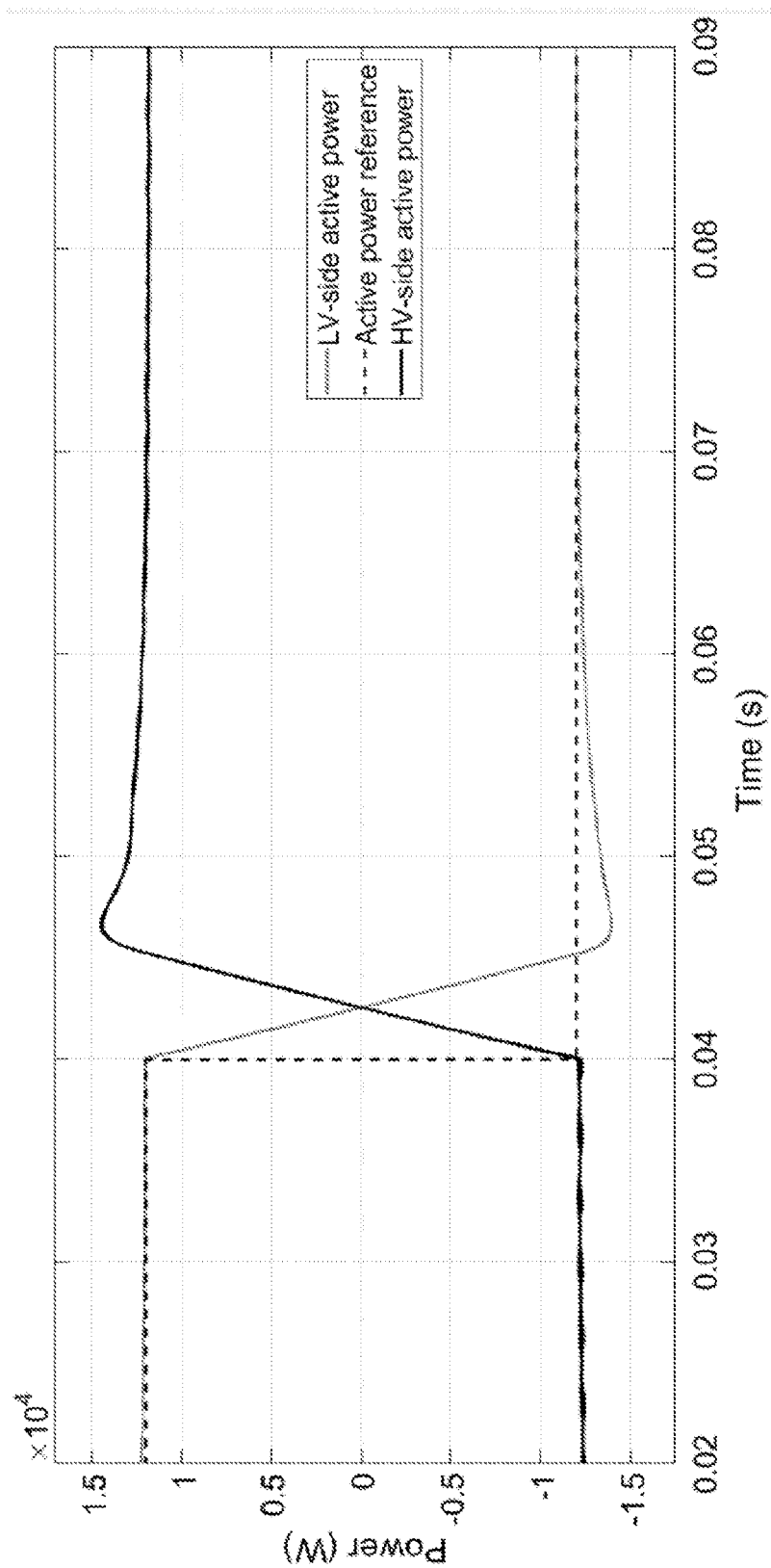
FIG. 13 shows the simulated step active power direction change based on the SST architecture according to FIG. 9 and FIG. 12.
Figure 14:
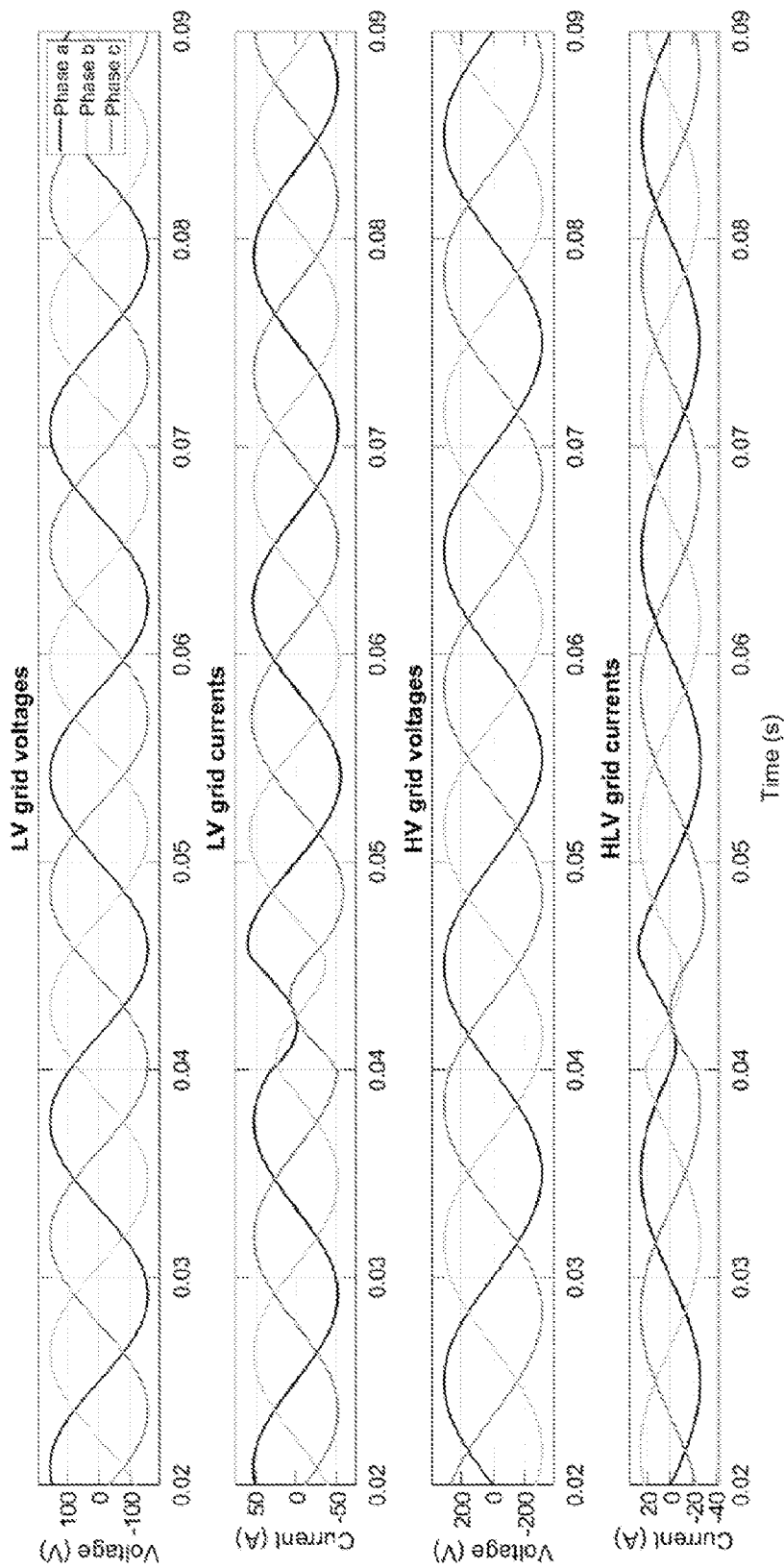
FIG. 14 shows the simulated grid voltages and currents in both HV and LV sides during the step power reversal test based on the SST architecture according to FIG. 9 and FIG. 12.

The results for two operating scenarios including step active power change and independent reactive power control are shown. In the first test scenario, the SST is initially operating with its rated active power being delivered from HV-side to the LV-side. At t=0.05 s the direction of reference power is changed suddenly. FIG. 13 shows the step action power direction change in the first test scenario. FIG. 14 shows the grid voltages and currents during step power reversal test. As shown in FIGS. 13 and 14, the SST control is able to quickly follow the reference and reverse the power direction in less than a cycle.

Figure 15:
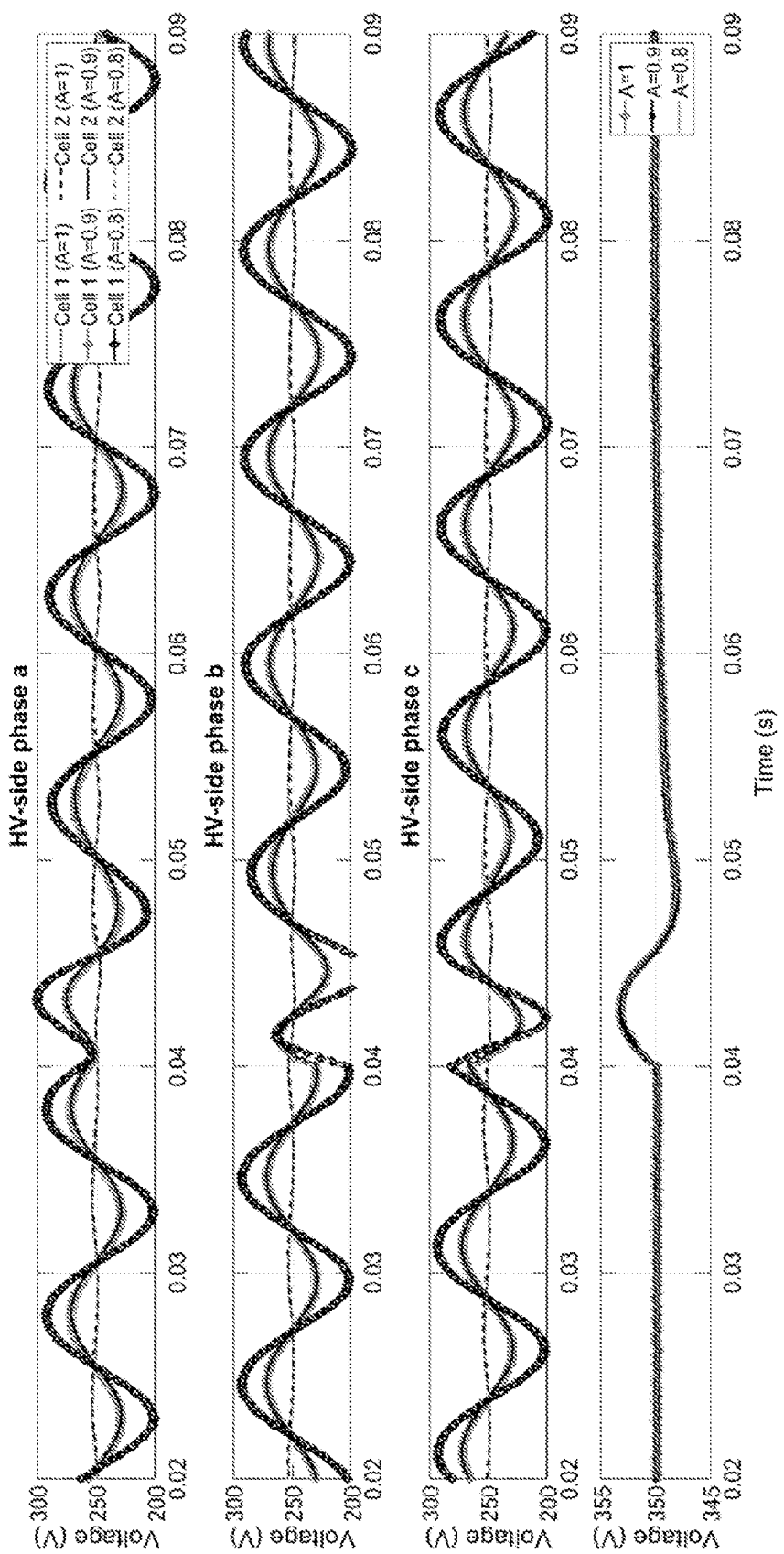
FIG. 15 shows the simulated capacitor voltages in HV side during the step power reversal test based on the SST architecture according to FIG. 9 and FIG. 12.
Figure 16:
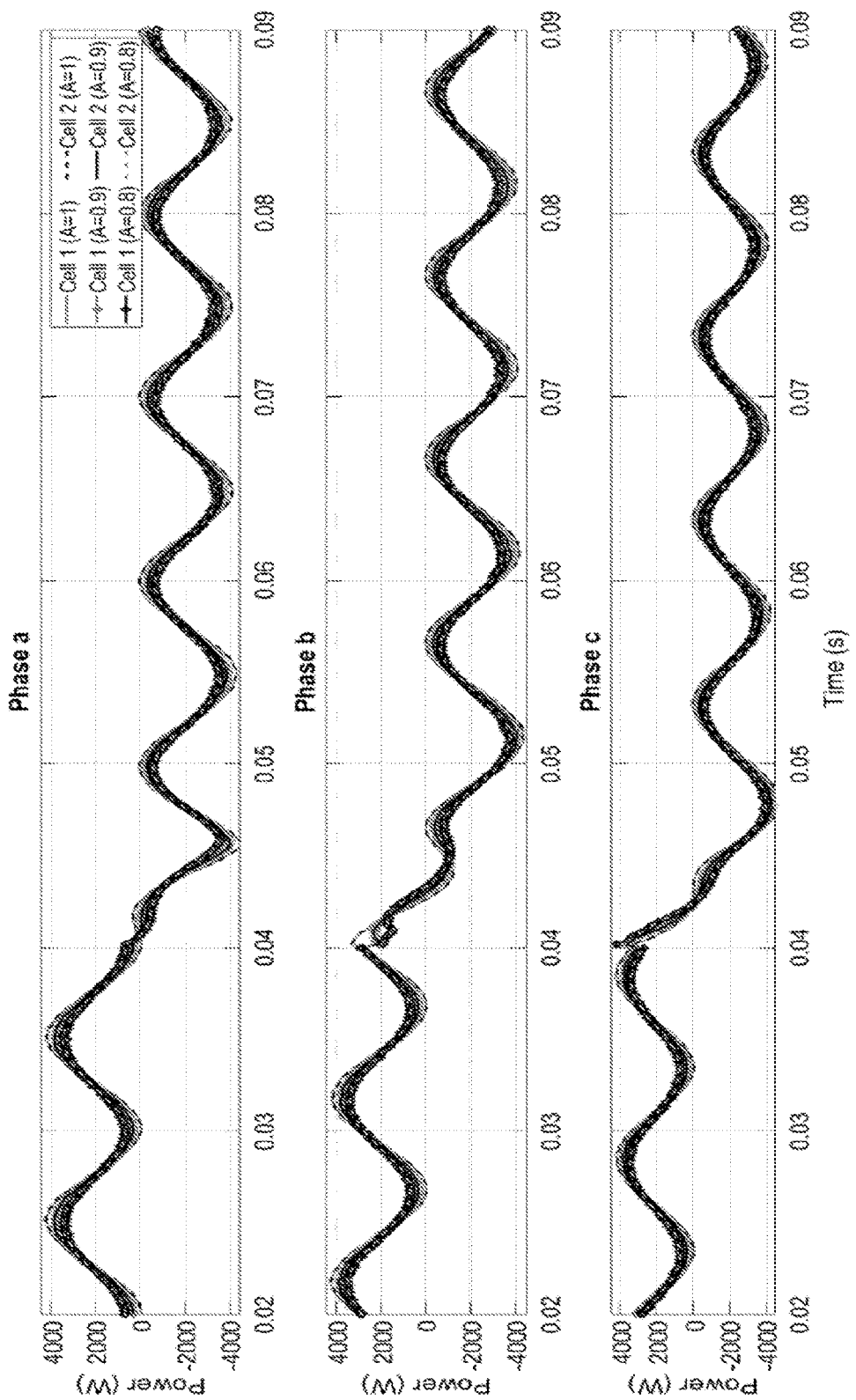
FIG. 16 shows the simulated DC-to-DC average power during the step power reversal test based on the SST architecture according to FIG. 9 and FIG. 12.

FIG. 15 shows the capacitors' voltages during the first test scenario. The control system is able to regulate the voltages with good dynamic. The low-frequency voltage ripple on the HV-side capacitors is effectively removed for A=1. In this figure, the results for partial compensation, A=0.9 and A=0.8 are also shown for comparison. As it can be seen with partial compensation (A<1), the capacitors voltage ripple increases. On the other hand, by allowing more voltage ripples on the HV-side capacitors, the maximum power magnitude that DC-to-DC converter needs to process reduces because of reduction in required circulating power between the phases as shown in FIG. 16. In this case, further reduction of A value is not possible without increasing the capacitance of HV-side capacitors as the voltage ripple on the capacitors becomes excessive.

Figure 17:
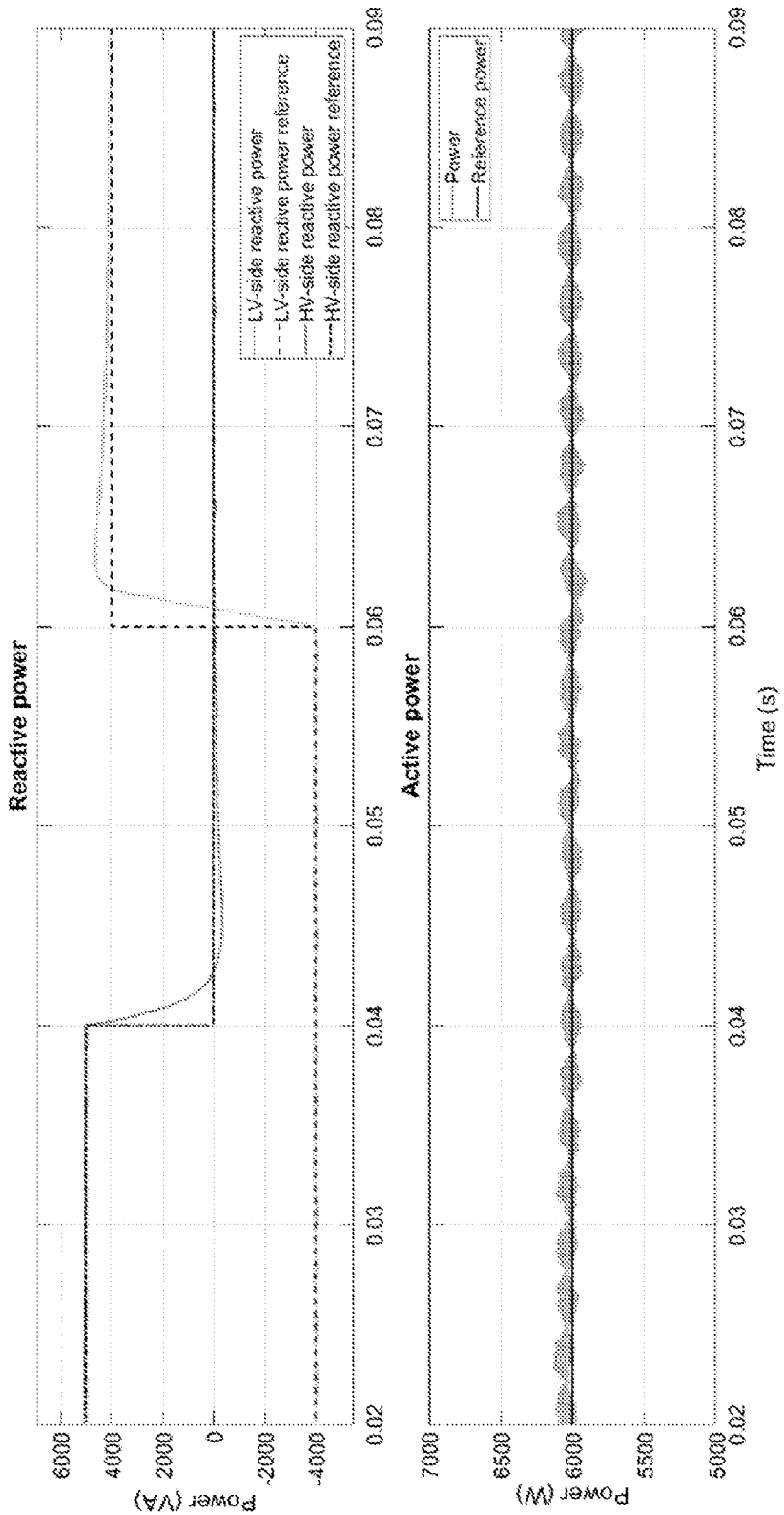
FIG. 17 shows the simulated step reactive power change based on the SST architecture according to FIG. 9 and FIG. 12.
Figure 18:
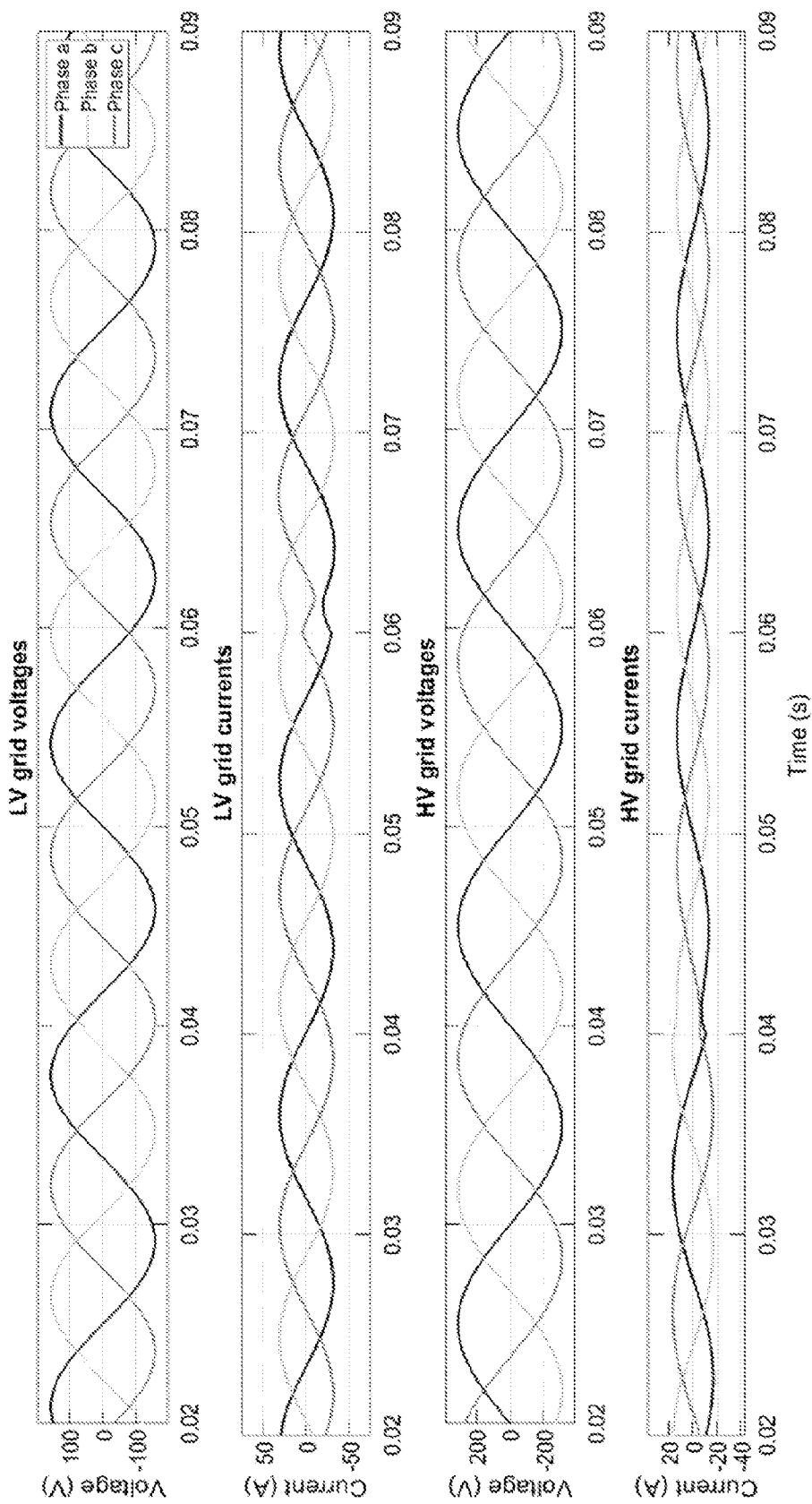
FIG. 18 shows the simulated grid currents and voltages during the step reactive power change test based on the SST architecture according to FIG. 9 and FIG. 12.
Figure 19:
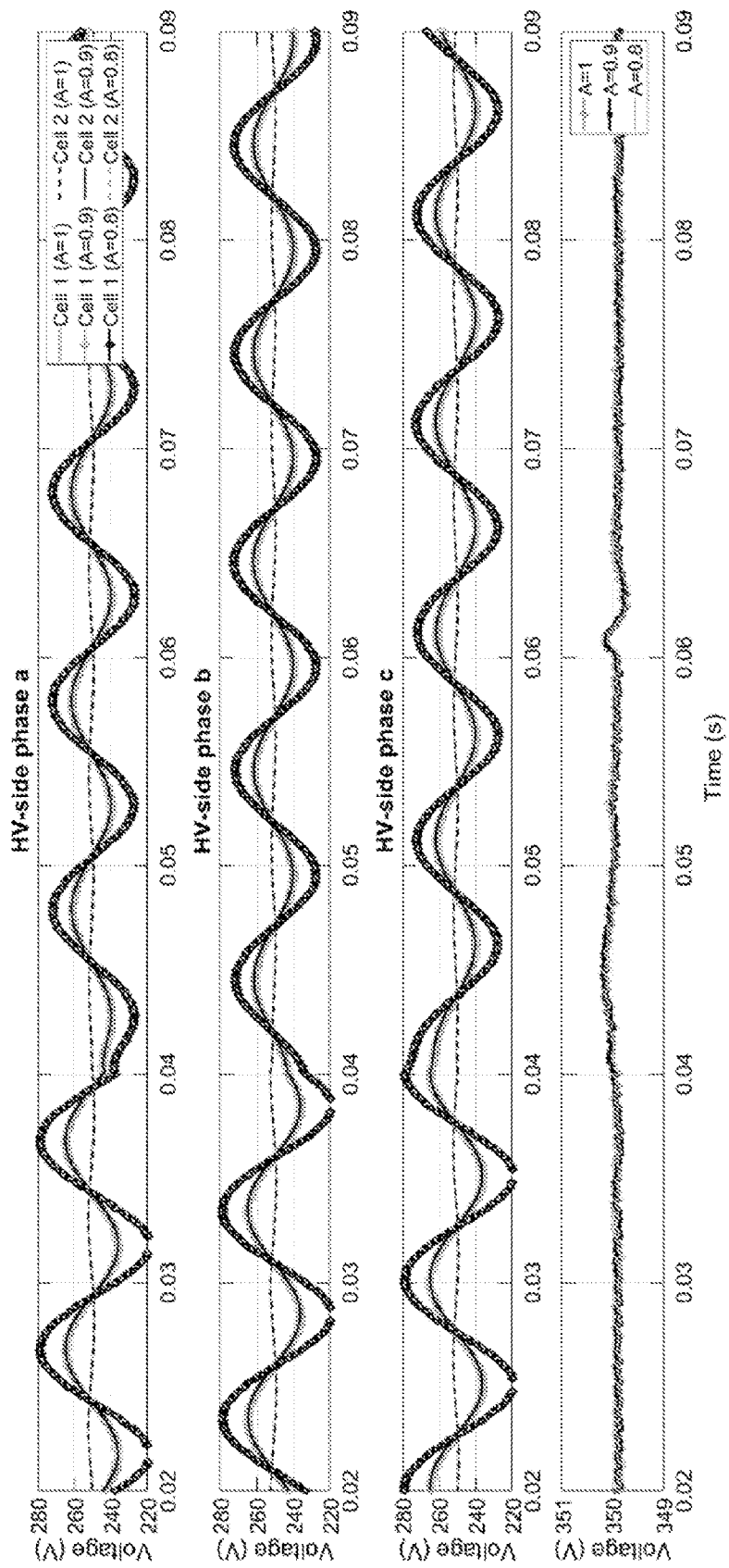
FIG. 19 shows the simulated capacitor voltages during the step reactive power change test based on the SST architecture according to FIG. 9 and FIG. 12.
Figure 20:
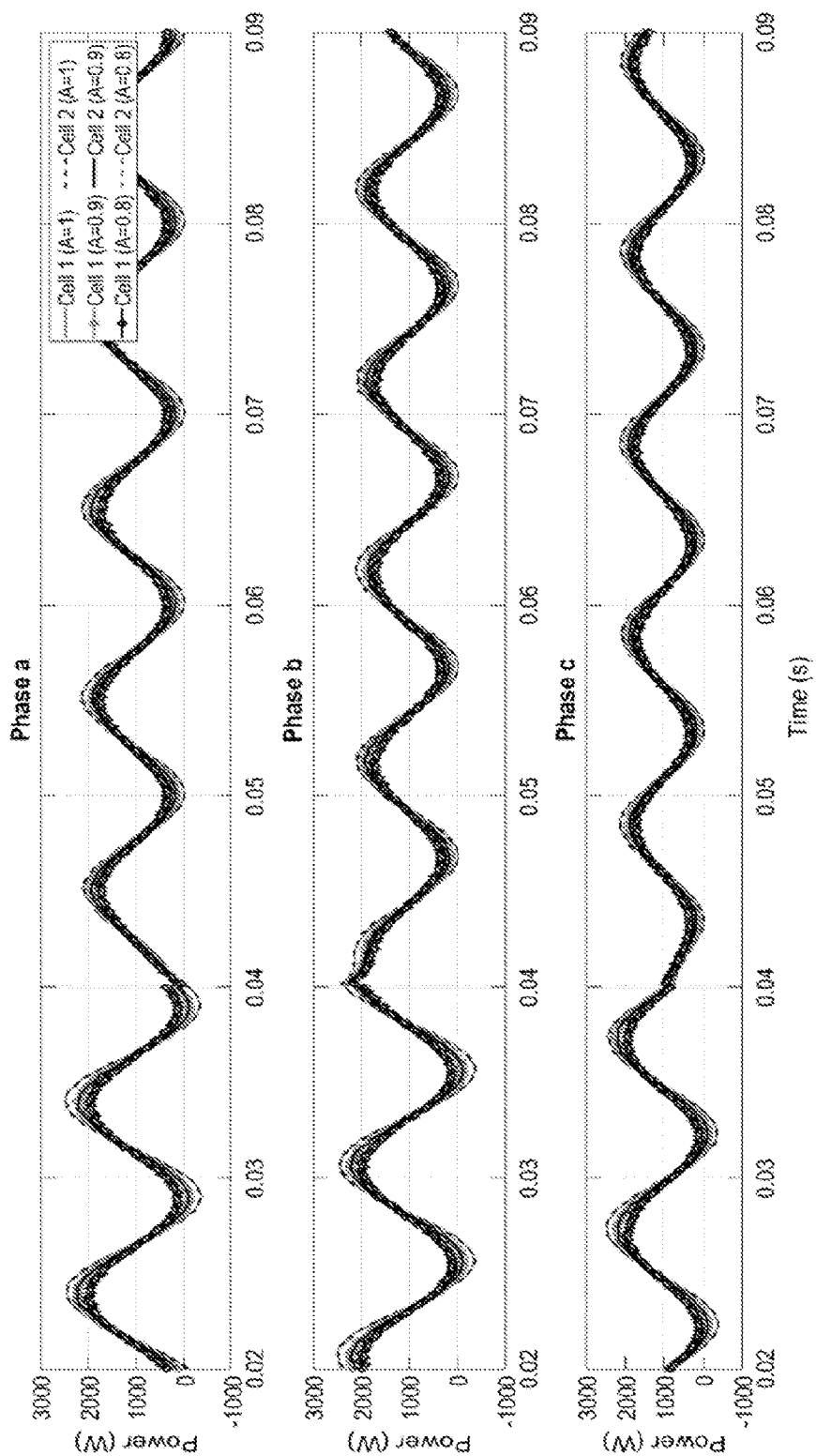
FIG. 20 shows the simulated DC-to-DC average power during the step reactive power change test based on the SST architecture according to FIG. 9 and FIG. 12.

In the second test scenario, the reactive power control functionality of the SST is assessed. Throughout the second test, the active power remains constant on 6 kW (from the HV-side to the LV-side). In FIG. 17, the reactive power and active power of SST are shown. At t=0.04 s, the reactive power reference for the HV-side changes from 5 kW to zero. Then, at t=0.06 s, the reactive power reference of LV-side changes from −4 kW to +4 kW. As can be seen, the SST is able to follow the reactive power command on both sides without any interruption or disturbance on the active power. Furthermore, as it can be seen the reactive power control on the LV-side and HV-side are completely independent. The variation of the grid parameters during this test is shown in FIG. 18. Capacitors' voltages and average DC-to-DC converters power are shown in FIG. 19 and FIG. 20, respectively. Similar to the previous scenario, the proposed control system is able to control the capacitors' voltages ripple magnitude independent of the power magnitude (depending on A).

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The invention claimed is:

1. A system for controlling a solid state transformer (SST), the SST comprising a high-voltage-side AC-to-DC stage, a low-voltage-side DC-to-AC stage, a DC-to-DC stage coupled between the HV-side AC-to-DC stage and the LV-side DC-to-AC stage, the DC-to-DC stage comprising one or more DC-to-DC converters, and a set of capacitors for storing energy therein, the system comprising:
a stored energy controller coupled to the HV-side AC-to-DC stage, the stored energy controller configured to control a total amount of the stored energy within the capacitors of the SST;
a power flow controller coupled to the LV-side DC-to-AC stage, the power flow controller configured to control power flow in the SST; and
one or more energy balancing controllers, each energy balancing controller of the one or more energy balancing controllers coupled to a corresponding DC-to-DC converter of the one or more DC-to-DC converters, each energy balancing controller configured to balance energy in the corresponding DC-to-DC converter,
wherein the stored energy controller, the power flow controller and the one or more energy balancing controllers are decoupled from one another such that the stored energy controller is configured to operate independently of the power flow controller and the one or more energy balancing controllers, such that the power flow controller is configured to operate independently of the stored energy controller and the one or more energy balancing controllers, and such that each of the one or more energy balancing controllers is configured to operate independently of the stored energy controller and the power flow controller.

2. The system of claim 1, wherein the stored energy controller, the power flow controller and the one or more energy balancing controllers are decoupled at a function level.

3. The system of claim 1, wherein the stored energy controller, the power flow controller and the one or more energy balancing controllers are decoupled at a state variable control level.

4. The system of claim 1, wherein the stored energy controller, the power flow controller and the one or more energy balancing controllers are configured with independent control objectives.

5. The system of claim 1, wherein the stored energy controller controls the HV-side AC-to-DC stage, the HV-side AC-to-DC stage comprising a plurality of HV-side AC-to-DC converters, each HV-side AC-to-DC converter of the plurality of HV-side AC-to-DC converters operative for charging/discharging a respective high voltage (HV) capacitor, to regulate the total amount of energy stored in the capacitors of the SST according to:

$$\frac{dE}{dt} = P_{HV} - P_{LV}$$

where $E=0.5\ (\Sigma_{j=1}^{N}\ Cj_{HV}vj_{HVdc}^{2}+C_{LV}v_{LVdc}^{2})$, $vj_{HVdc}$ is a voltage of $j^{th}$ HV-side capacitor, $Cj_{HV}$ is a capacitance of $j^{th}$ capacitor in HV-side, $v_{LVdc}$ is a voltage of LV-side capacitor, $C_{LV}$ is a capacitance of the LV-side capacitor, $P_{HV}=\Sigma_{j=1}\ Pi_{HV}$ with $P_{HV}$ being the active power passing through HV-side AC-to-DC converter, and $P_{LV}$ is the active power passing through the LV-side DC-to-AC converter.

6. The system of claim 5, wherein the power flow controller controls the LV-side DC-to-AC stage, the LV-side DC-to-AC stage comprising a LV-side DC-to-AC converter that charges/discharges the LV-side capacitor to satisfy $P_{LV}$.

7. The system of claim 6, wherein the one or more energy balance controllers is configured to indirectly control a dynamic HV-side capacitor voltage based on a state variable defined by:

$$\frac{d\Delta Ej}{dt} = Pj_{dc-dc}, (j = 1, 2, \ldots, N),$$

where $\Delta Ej=0.5\ (Cj_{HV}vj_{HVdc}^{2}-C_{LV}v_{LVdc}^{2})$, $(j=1, 2, \ldots, N)$, $C_{LV}$ is the capacitance of the LV-side capacitor, and $v_{LVdc}$ is the voltage of LV-side capacitor.

8. The system of claim 5, wherein the one or more energy balance controllers is configured to indirectly control a respective dynamic capacitor voltage to actively remove or regulate the magnitude of voltage ripple on the HV-side capacitor voltage.

9. The system of claim 1, wherein each controller is a proportional integral controller.

10. The system of claim 1, wherein power reference for each DC-to-DC converter is generated by adding a feedforward compensation to proportional integral output.

11. The system of claim 1, wherein power in the one or more DC-to-DC converters is regulated by a phase shift switching strategy.

12. A method for controlling a solid state transformer (SST) using a system according to claim 1, comprising:
controlling stored energy in the SST using the stored energy controller;
controlling power flow in the SST using the power flow controller; and
balancing energy in the corresponding DC-to-DC converter using the one or more energy balancing controllers.

13. The method of claim 12, wherein the controlling stored energy occurs at a first location, the controlling power flow occurs at a second location and the balancing energy occurs at a third location, wherein at least two of the first location, second location and third location are spaced from each other.

* * * * *